United States Patent
Sakamaki et al.

(10) Patent No.: US 11,927,666 B2
(45) Date of Patent: Mar. 12, 2024

(54) SIGNAL PROCESSING APPARATUS AND SIGNAL PROCESSING METHOD

(71) Applicant: Mitsubishi Electric Corporation, Tokyo (JP)

(72) Inventors: Hiroshi Sakamaki, Tokyo (JP); Ikuya Kakimoto, Tokyo (JP); Tomoya Matsuda, Tokyo (JP); Takamichi Nakamizo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 659 days.

(21) Appl. No.: 17/262,213

(22) PCT Filed: Jun. 14, 2019

(86) PCT No.: PCT/JP2019/023707
§ 371 (c)(1),
(2) Date: Jan. 22, 2021

(87) PCT Pub. No.: WO2020/031505
PCT Pub. Date: Feb. 13, 2020

(65) Prior Publication Data
US 2021/0302562 A1 Sep. 30, 2021

(30) Foreign Application Priority Data

Aug. 6, 2018 (JP) .................. 2018-147533

(51) Int. Cl.
*G01S 13/42* (2006.01)
*G01S 13/52* (2006.01)
*G01S 13/524* (2006.01)

(52) U.S. Cl.
CPC ............ *G01S 13/42* (2013.01); *G01S 13/524* (2013.01)

(58) Field of Classification Search
CPC ...... G01S 13/42; G01S 13/524; G01S 15/584; G01S 17/58; G01S 7/527; G01S 13/20;
(Continued)

(56) References Cited

U.S. PATENT DOCUMENTS 6,081,221 A * 6/2000 Zrnic .................. G01S 13/95
342/134
2011/0304501 A1 * 12/2011 Marui .................. G01S 7/414
342/26 R

FOREIGN PATENT DOCUMENTS

JP 2012-83235 A 4/2012
JP 2012083235 A * 4/2012 ............. G01S 13/50
(Continued)

OTHER PUBLICATIONS

Masahito Ishihara, "Doppler Weather Radar", Kisho Kenkyuu Note No. 200, the Meteorological Society of Japan, Dec. 2001, pp. 26-31 (9 pages including English Translation).
(Continued)

*Primary Examiner* — Bernarr E Gregory
*Assistant Examiner* — Juliana Cross
(74) *Attorney, Agent, or Firm* — XSENSUS LLP

(57) ABSTRACT

A secondary echo and a primary echo subjected to topographic echo processing are compared with each other. When there is a topographic echo in the primary echo or the secondary echo determined as a strong echo, an echo resulting from removal of the topographic echo is defined as a strong-topographic-echo-removed reception signal. Electric power of the topographic echo in the secondary echo or the primary echo determined as a weak echo and the strong-topographic-echo-removed reception signal are defined as weak echo parameters. Electric power of the weak echo estimated from a reception signal in a weak echo region resulting from phase correction of a reception signal resulting from removal of a frequency component of the strong
(Continued)

echo from the strong-topographic-echo-removed reception signal representing the weak echo parameter, a spectral width of the weak echo representing the weak echo parameter, and a Doppler velocity of the weak echo are provided as spectral parameters.

19 Claims, 10 Drawing Sheets

(58) Field of Classification Search
CPC .......... G01S 13/95; G01S 7/41; G01S 13/582; Y02A 90/10
See application file for complete search history.

(56) References Cited

FOREIGN PATENT DOCUMENTS

| | | | | |
|---|---|---|---|---|
| JP | 2015-148474 A | 8/2015 | | |
| JP | 2015148474 A | * | 8/2015 | ........... G01S 13/524 |

OTHER PUBLICATIONS

International Search Report and Written Opinion dated Sep. 10, 2019, received for PCT Application PCT/JP2019/023707, Filed on Jun. 14, 2019, 9 pages including English Translation.

* cited by examiner

SIGNAL PROCESSING APPARATUS AND SIGNAL PROCESSING METHOD

CROSS-REFERENCE TO RELATED APPLICATIONS

The present application is based on PCT filing PCT/JP2019/023707, filed Jun. 14, 2019, which claims priority to JP 2018-147533, filed on Aug. 6, 2018, the entire contents of each are incorporated herein by reference.

TECHNICAL FIELD

The present invention relates to a signal processing apparatus and a signal processing method for processing a signal from an observation apparatus (a measurement apparatus) that uses undulation such as electromagnetic waves or sound waves for measuring a distance to and a velocity of a target or an object that is remotely located.

BACKGROUND ART

An observation apparatus (a measurement apparatus) using undulation such as electromagnetic waves or sound waves has conventionally been available as an apparatus that measures a distance to and a velocity of a target or an object that is remotely located. For such an observation apparatus (a measurement apparatus), a pulse Doppler technique using a radar apparatus, a lidar (lightwave radar) apparatus, or a sodar (sonic radar) apparatus has been known. According to some pulse Doppler techniques, an echo outside a basic sweep cycle (outside a distance measurement range) is used or removed. Though description will be given hereinafter with reference to a radar apparatus (in particular, a pulse Doppler radar apparatus) by way of example of the observation apparatus, application of the signal processing apparatus and the signal processing method according to the present application is not limited to application to the radar apparatus. The pulse Doppler technique is used also for an observation apparatus (a measurement apparatus) such as a weather radar apparatus directed to precipitation particles (raindrops). Though an example in which a radar apparatus is a weather radar apparatus may be described below by way of example, application of the signal processing apparatus and the signal processing method according to the present application is not limited to application to the radar apparatus such as a weather radar apparatus, and they can be applied to another observation apparatus (measurement apparatus).

In an observation method (a measurement method) for measuring a distance to and a velocity of a target or an object that is remotely located with the use of an observation apparatus (a measurement apparatus) as such, transmission waves are subjected to pulse modulation and a distance is calculated based on a time lag between transmission and reception of pulses. By frequency-analysis of reception signals sampled with pulse recurrence periods, a Doppler frequency (a Doppler velocity) of a target can be calculated.

In order to unambiguously measure a distance to a target, a pulse recurrence period should be set to be longer than a time lag between transmission and reception pulses. On the other hand, in order to unambiguously measure a velocity of a target that moves fast, a reception signal should be sampled fast (a pulse recurrence period should sufficiently be short). Therefore, it is difficult to simultaneously achieve elimination of ambiguity of a distance and elimination of ambiguity of a Doppler velocity simply by adjusting the pulse recurrence period. Regarding radar set to satisfy a desired distance measurement range and a desired velocity measurement range, pulses emitted prior to pulses from which a currently processed reception signal has been originated may be scattered by an object located beyond the distance measurement range and return to the radar.

For a reception signal of a reflected wave that returns to the radar, a signal received as a result of emission of a pulse and scattered by an object located within the distance measurement range prior to emission of a next pulse is called a primary echo and a signal received as a result of emission at a time point preceding by one time point and scattered by an object beyond the distance measurement range is called a secondary echo. Reception signals of pulses emitted at time points preceding by at least one time point are collectively referred to as multi-order echoes. In other words, an (n+1)th-order echo where n represents a positive integer can be defined as a multi-order echo. Though the primary echo and the secondary echo are addressed below, a multi-order echo equal to or higher than a third order is also similarly handled. Since the secondary echo appears within a distance measurement range where the primary echo appears, it may erroneously be recognized as the primary echo or may be superimposed on the primary echo, which leads to overassessment or underassessment of characteristics intrinsic to the primary echo. Therefore, the secondary echo is desirably suppressed.

A method of suppressing a secondary echo by using two types of pulse recurrence times (which may be expressed as a pulse recurrence frequency which is an inverse of a pulse recurrence period) and using such a property that positions where secondary echoes appear are varied every pulse recurrence time is available as the method of suppressing the secondary echo (see, for example, NPL 1). In addition, a method of not taking in a secondary echo by using also a sufficiently long pulse recurrence period for which no secondary echo is produced (see, for example, NPL 1) or a method of enhancing accuracy in estimating a primary echo by regarding the secondary echo as noise or removing the secondary echo in reproduction of the primary echo by performing phase modulation between pulses (see, for example, NPL 1 and PTLs 1 and 2) are available as the method of suppressing the secondary echo.

The method using phase modulation between pulses as described previously has a property as below. For example, when a topographic echo (ground clutter) which is large reflection from the ground or mountains is contained in the same range cell, strength, a Doppler velocity, and a spectral width that represent spectral parameters finally estimated by weather radar may suffer from a large estimation error. Therefore, in general, the topographic echo is removed and then a spectral parameter is estimated.

As a result of removal of the topographic echo, however, accuracy in estimation of a spectral parameter of a secondary echo may become poor. For example, when topographic echo removal (moving target indicator; MTI) processing is performed in a primary echo region, a phase of a signal is disturbed during the course thereof. Since the phase is disturbed, topographic echoes are not built up around Doppler 0 but are diffused in a secondary echo region, and a situation is similar to a case of increase in noise level of a Doppler spectrum. Consequently, accuracy in estimation of the spectral parameter of the secondary echo becomes poor. This is also applicable when the primary echo and the secondary echo are interchanged.

In order to address this, PTL 1 discloses a method of suppressing deterioration of accuracy in estimation of a spectral parameter by estimating strength of a primary topographic echo and a secondary echo in advance and initially removing an echo higher in strength, that is, an echo greater in influence by echoing.

PTL 2 discloses a method of using a search target by comparing strength of a reception signal resulting from removal of topographic clutter from a secondary echo with strength of a reception signal resulting from removal of topographic clutter from a primary echo and using the reception signal in a region higher in strength.

CITATION LIST

Patent Literature

PTL 1: Japanese Patent Laying-Open No. 2012-83235
PTL 2: Japanese Patent Laying-Open No. 2015-148474

Non Patent Literature

NPL 1: Masahito Ishihara, Doppler Weather Radar, Kisho Kenkyuu Note No. 200, the Meteorological Society of Japan, pp. 27-30, 2001.

SUMMARY OF INVENTION

Technical Problem

With the method disclosed in PTL 1, however, for example, in such a situation that a weather echo and a topographic echo are present in both of primary and secondary echo regions, a strong multi-order echo continues to remain also after comparison of strength. Therefore, deterioration of accuracy in estimation of a spectral parameter cannot completely be suppressed.

With the method disclosed in PTL 2, for example, in such a situation that a weather echo and a topographic echo are present in both of primary and secondary echo regions, removal of the topographic echo in an echo region higher in strength and removal of an echo higher in strength are carried out onto a reception signal in a region lower in strength, which leads to disturbance of phase relation. Deterioration of accuracy in estimation of a spectral parameter cannot completely be suppressed.

The present invention was made to solve problems as above, and relates to a signal processing apparatus and a signal processing method capable of suppressing deterioration of accuracy in estimation of a spectral parameter in primary and secondary echo regions even though a strong weather echo or a strong topographic echo is present in both of the primary and secondary echo regions.

Solution to Problem

In a signal processing apparatus and a signal processing method according to the present invention, a topographic-echo-processed secondary echo and a topographic-echo-processed primary echo are compared with each other. When there is a topographic echo in the primary echo or the secondary echo determined as a strong echo, an echo from which the topographic echo has been removed is defined as a strong-topographic-echo-removed reception signal. Electric power of the topographic echo in the secondary echo or the primary echo determined as a weak echo and the strong-topographic-echo-removed reception signal are defined as weak echo parameters. Electric power of a weak echo estimated from a reception signal in a weak echo region resulting from phase correction of a reception signal resulting from removal of a frequency component of a strong echo from the strong-topographic-echo-removed reception signal representing the weak echo parameter, a spectral width of the weak echo representing the weak echo parameter, and a Doppler velocity of the weak echo are provided as spectral parameters of the weak echo.

Advantageous Effects of Invention

As set forth above, according to the present invention, a signal processing apparatus and a signal processing method capable of suppressing deterioration of accuracy in estimation of a spectral parameter in primary and secondary echo regions by using information on electric power of a topographic echo or presence of a topographic echo can be obtained.

DESCRIPTION OF EMBODIMENTS

The present application is directed to a signal processing apparatus and a signal processing method in which phase modulation between pulses is suitably used ideally without change in range of measurement of a Doppler velocity or the like, phase modulation between pulses being expected to achieve also doubling of a distance measurement range by regarding a primary echo as noise or removing the primary echo in reproduction of a secondary echo. Specifically, the present application is directed to processing of a reception signal of a reflected wave of pulse undulation repeatedly transmitted into a space. Though the signal processing apparatus and the signal processing method according to the present application are described with reference to a radar apparatus by way of example, application of the present application is not limited to the radar apparatus. The present application can be applied to an observation apparatus (a measurement apparatus) that uses undulation such as electromagnetic waves or sound waves for measuring a distance to and a velocity of a target or an object that is remotely located. A pulse Doppler technique using a radar apparatus, a lidar (lightwave radar) apparatus, or a sodar (sonic radar) apparatus has been known for the observation apparatus (measurement apparatus).

First Embodiment

Figure 1:
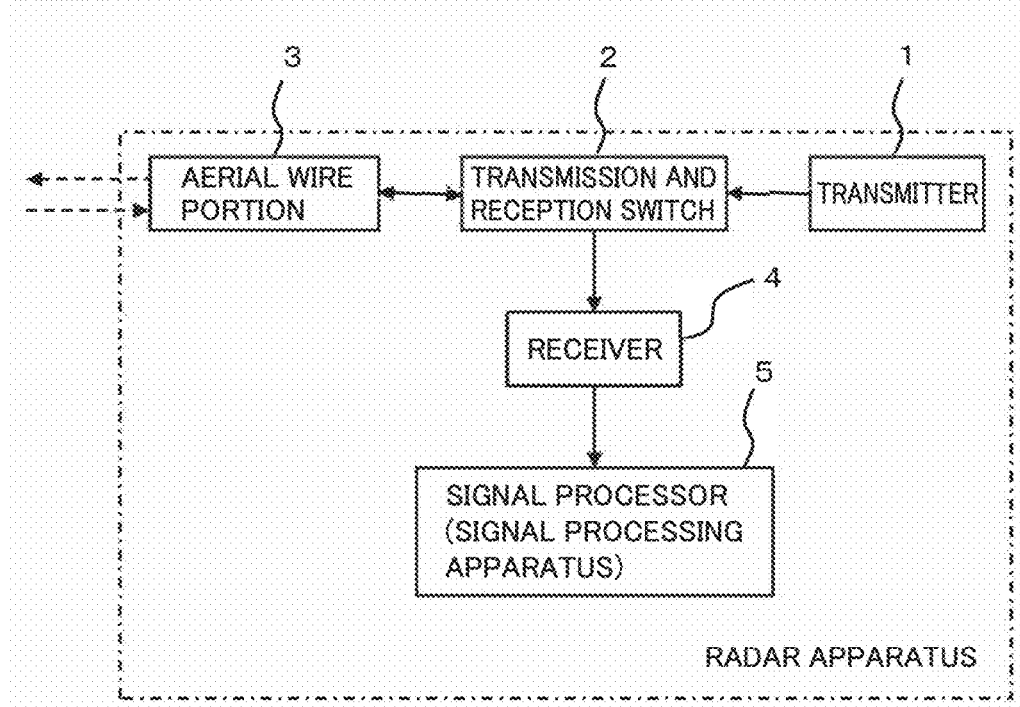
FIG. 1 is a functional block diagram of a radar apparatus to which a signal processing apparatus according to first and second embodiments of the present invention is applied.

A signal processing apparatus and a signal processing method according to a first embodiment of the present invention will be described below with reference to FIGS. 1 to 5. In particular, the signal processing method according to the first embodiment will be described with reference to FIGS. 3 and 5. FIG. 1 is a functional block diagram of a radar apparatus (an observation apparatus or a measurement apparatus) to which the signal processing apparatus according to the first embodiment is applied. In the present application, a block configuration of the radar apparatus (the observation apparatus or the measurement apparatus) is the same in all embodiments. The signal processing apparatus according to the first embodiment and the radar apparatus (the observation apparatus or the measurement apparatus) to which the signal processing apparatus is applied can be carried out also according to a block configuration different from that in FIG. 1. The configuration shown in FIG. 1 is an exemplary block configuration. The same or corresponding elements in the drawings of the present application have the same reference characters allotted and detailed description thereof may not be provided.

Figure 2:
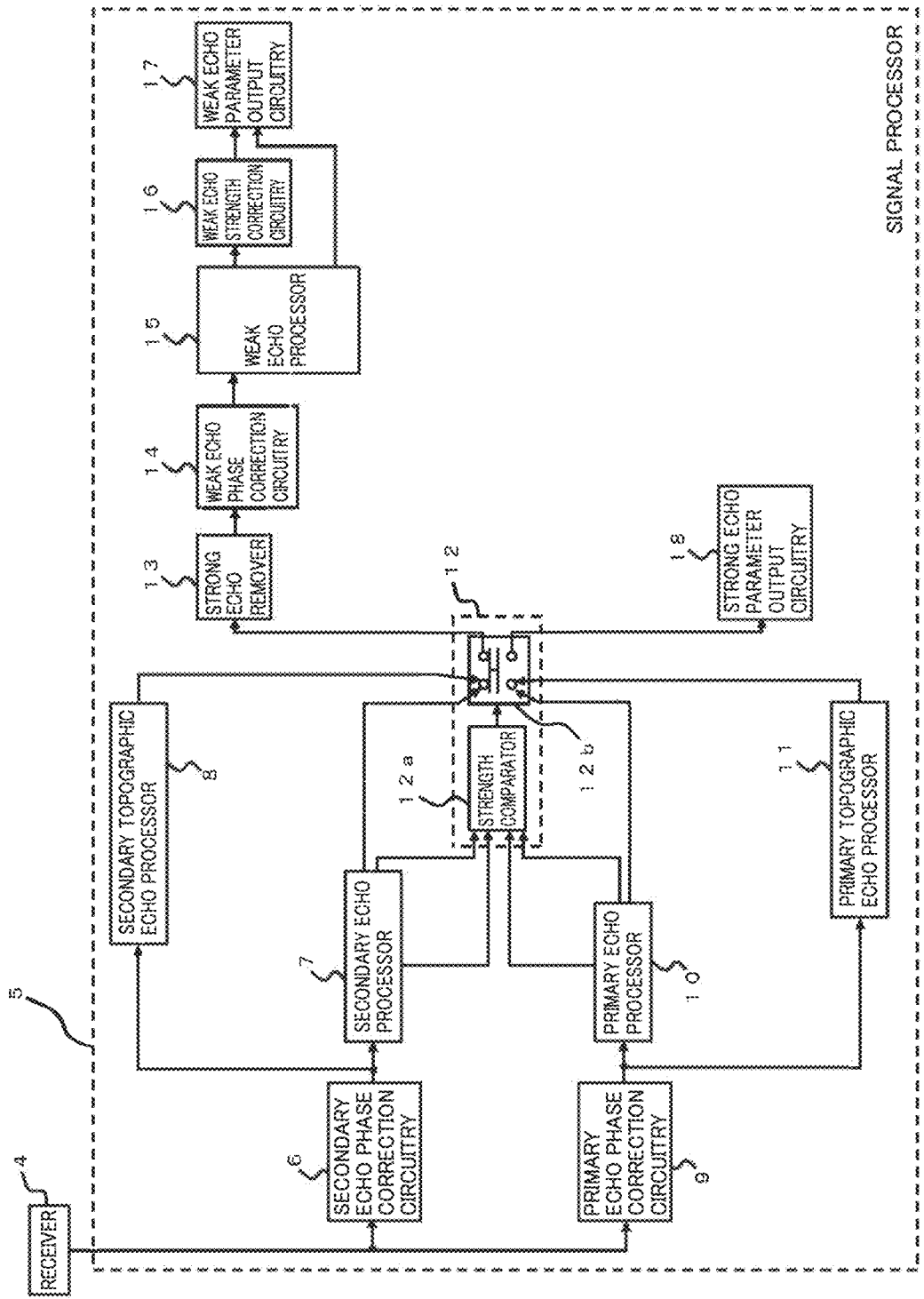
FIG. 2 is a functional block diagram of the signal processing apparatus according to the first embodiment of the present invention.

In FIGS. 1 and 2, a radar apparatus to which the signal processing apparatus according to the first embodiment is applied includes a transmitter 1, a transmission and reception switch 2, an aerial wire portion 3 (an antenna portion 3), a receiver 4, and a signal processor 5 (signal processor 5 corresponding to the signal processing apparatus according to the present application). These can be defined as the radar apparatus according to the first embodiment. In other words, the observation apparatus (measurement apparatus) according to the first embodiment can be defined as including transmitter 1, transmission and reception switch 2, aerial wire portion 3 (antenna portion 3) or an optical scanner 3 or a sound wave speaker 3, receiver 4, and signal processor 5 (the signal processing apparatus according to the present application). Aerial wire portion 3 (antenna portion 3) or optical scanner 3 or sound wave speaker 3 can be defined as an undulation emitter and accepter 3. Such undulation emitter and accepter 3 may be constituted of a transmitter and a receiver separate from each other.

The signal processing apparatus (signal processor 5) according to the first embodiment measures an object by processing a reception signal of reflected undulation (a reflected wave) resulting from radiation of pulsed undulation into a space and scattering of undulation by an object present in the space. Similarly, the signal processing method according to the first embodiment is a method of measuring an object by processing a reception signal of reflected undulation (a reflected wave) resulting from radiation of pulsed undulation into a space and scattering of undulation by an object present in the space.

In FIGS. 1 and 2, transmitter 1 generates a reference signal on which transmission waves are based and subjects the reference signal to pulse modulation, such phase modulation as varying an initial phase each time of transmission, frequency conversion, or amplification. Transmission and reception switch 2 outputs pulsed undulation which is transmission waves generated in transmitter 1 to aerial wire portion 3 and takes in reception waves from aerial wire portion 3. Aerial wire portion 3 radiates pulsed undulation as transmission waves into a space and obtains as reception waves (a reflected wave), incoming radio waves (reflected undulation) as a result of reflection by an object present in the space. Receiver 4 takes in reception waves received at aerial wire portion 3 and passing through transmission and reception switch 2 and subjects the reception waves to frequency conversion and amplification. Thereafter, receiver 4 demodulates the reception waves, generates a reception signal (a reception signal of a reflected wave of pulsed undulation), and sends the reception signal to signal processor 5.

FIG. 2 is a functional block diagram showing a configuration of the signal processing apparatus (signal processor 5) according to the first embodiment. In FIG. 2, secondary echo phase correction circuitry 6 generates a reception signal in a secondary echo region by phase correction of the reception signal sent from receiver 4. A secondary echo processor 7 removes a topographic echo from the reception signal in the secondary echo region and estimates electric power of the topographic-echo-processed secondary echo, a spectral width of the topographic-echo-processed secondary echo, and a Doppler velocity of the topographic-echo-processed secondary echo. Secondary echo processor 7 removes the topographic echo in the reception signal in the secondary echo region by estimating a low-frequency component as the topographic echo. A secondary topographic echo processor 8 estimates electric power of a topographic-echo-unprocessed secondary echo from the reception signal in the secondary echo region and calculates electric power of the secondary topographic echo based on a difference between electric power of the topographic-echo-unprocessed secondary echo and electric power of the topographic-echo-processed secondary echo. The topographic-echo-unprocessed secondary echo means a secondary echo before elimination of the topographic echo from the secondary echo. An echo resulting from elimination of a topographic echo from a secondary echo or a secondary echo confirmed to originally be free from a topographic echo is referred to as a topographic-echo-processed secondary echo.

In FIG. 2, primary echo phase correction circuitry 9 generates a reception signal in a primary echo region by phase correction of a reception signal sent from receiver 4. A primary echo processor 10 estimates electric power of a topographic-echo-processed primary echo, a spectral width of the topographic-echo-processed primary echo, and a Doppler velocity of the topographic-echo-processed primary echo by removing a topographic echo from the reception signal in the primary echo region. Primary echo processor 10 removes the topographic echo in the reception signal in the primary echo region by estimating a low-frequency component thereof. A primary topographic echo processor 11 estimates electric power of the topographic-echo-unprocessed primary echo from the reception signal in the primary echo region and calculates electric power of the primary topographic echo based on a difference between electric power of the topographic-echo-unprocessed primary echo and electric power of the topographic-echo-processed primary echo. The topographic-echo-unprocessed primary echo means a primary echo before elimination of the topographic echo from the primary echo. An echo resulting from elimination of a topographic echo from a primary echo and a primary echo confirmed to originally be free from a topographic echo is referred to as a topographic-echo-processed primary echo.

In FIG. 2, strong-and-weak-echo distinction and output circuitry 12 includes a strength comparator 12a and a strong-and-weak-echo switch 12b. Strength comparator 12a compares a topographic-echo-processed secondary echo and a topographic-echo-processed primary echo with each other and makes categorization thereof into a strong echo and a weak echo. Strong-and-weak-echo switch 12b provides as weak echo parameters, a strong-topographic-echo-removed reception signal resulting from removal of a topographic echo in a primary echo or a secondary echo determined as a strong echo and electric power of the topographic echo in the secondary echo or the primary echo determined as the weak echo. Specifically, strong-and-weak-echo distinction and output circuitry 12 makes categorization into the strong echo and the weak echo based on at least one of a comparison of magnitude between electric power of the topographic-echo-processed secondary echo and electric power of topographic-echo-processed primary topographic echo and a comparison of magnitude between a spectral width of the topographic-echo-processed secondary echo and a spectral width of the topographic-echo-processed primary echo. When magnitude of electric power is compared, an echo higher in strength (electric power) is determined as the strong echo and an echo lower in strength (electric power) is determined as the weak echo. When magnitude of the spectral width is compared, an echo smaller in spectral width is determined as the strong echo and an echo larger in spectral width is determined as the weak echo. When strong-and-weak-echo distinction and output circuitry 12 makes both of comparison of magnitude of electric power and comparison of magnitude of the spectral width and results of both of them do not match, strength (electric power) of a multi-order echo may be included. Therefore, priority should be placed on the spectral width. Strong-and-weak-echo distinction and output circuitry 12 should only make determination for categorization into the strong echo and the weak echo with priority being placed on a result of comparison of magnitude of the spectral width over a result of comparison of magnitude of electric power. Strong-and-weak-echo distinction and output circuitry 12 provides a spectral parameter of the secondary echo or the primary echo determined as the strong echo.

In FIG. 2, a strong echo remover 13 generates a reception signal resulting from removal of a frequency component of the strong echo from the strong-topographic-echo-removed reception signal that represents the weak echo parameter. This means removal of a weather echo further closer to a strong echo than the strong-topographic-echo-removed reception signal and processing for allowing only the weak echo to remain. Weak echo phase correction circuitry 14 generates a reception signal in a weak echo region by phase correction of the reception signal resulting from removal of the frequency component of the strong echo. Preferably, a weak echo processor 15 estimates electric power of the weak echo, a spectral width of the weak echo, and a Doppler velocity of the weak echo from the reception signal in the weak echo region.

In FIG. 2, weak echo strength correction circuitry 16 corrects electric power of the weak echo with electric power of the topographic echo representing the weak echo parameter. Weak echo parameter output circuitry 17 (weak echo spectral parameter output circuitry 17) provides electric power of the weak echo corrected by weak echo strength correction circuitry 16, the spectral width of the weak echo estimated by weak echo processor 15, and the Doppler velocity of the weak echo as spectral parameters of the weak echo. Weak echo parameter output circuitry 17 provides the spectral parameters (strength (electric power), the Doppler velocity, and the spectral width) of the weak echo provided from strong-and-weak-echo distinction and output circuitry 12 and derived by signal processing and primary echo/secondary echo categorization, for example, to a display (not shown) such as a liquid crystal display and has the display show them. At this time, for the primary echo, the spectral parameter is shown at a distance as long as a primary echo region determined by a pulse recurrence period, and for the secondary echo, the spectral parameter is shown at a distance twice as long as the pulse recurrence period (a secondary echo region).

In FIG. 2, strong echo parameter output circuitry 18 (strong echo spectral parameter output circuitry 18) provides as spectral parameters of the strong echo, electric power, a spectral width, and a Doppler velocity of a topographic-echo-processed echo of the secondary echo or the primary echo determined as the strong echo. Strong echo parameter output circuitry 18 may be a part (a function) of strong-and-weak-echo distinction and output circuitry 12 (specifically, strong-and-weak-echo switch 12b). Strong echo parameter output circuitry 18 provides the spectral parameters (strength (electric power), the Doppler velocity, and the spectral width) of the strong echo provided from strong-and-weak-echo distinction and output circuitry 12 and primary echo/secondary echo categorization, for example, to a display (not shown) such as a liquid crystal display and has the display show them. At this time, for the primary echo, the spectral parameter is shown at a distance as long as a primary echo region determined by a pulse recurrence period, and for the secondary echo, the spectral parameter is shown at a distance twice as long as the pulse recurrence period (a secondary echo region).

Therefore, the signal processing apparatus according to the first embodiment performs signal processing for measurement of an object by using a strong-topographic-echo-removed reception signal resulting from removal of a topographic echo in a primary echo (or a secondary echo) determined as the strong echo. Specifically, weak echo strength correction circuitry 16 corrects electric power of the weak echo estimated by removal of a frequency component of the strong echo corresponding to a weather echo in the strong echo region from the strong-topographic-echo-removed reception signal resulting from removal of the topographic echo in the strong echo and following phase correction of the resultant echo into an echo in the weak echo region. For correction, electric power of the topographic echo representing the weak echo parameter is used. Correction by weak echo strength correction circuitry 16 means removal of the topographic echo in the secondary echo (or the primary echo) determined as the weak echo from the secondary echo (or the primary echo) determined as the weak echo. Therefore, the signal processing apparatus according to the first embodiment can suppress deterioration of accuracy in estimation of a weather echo in the weak echo by suppressing the topographic echo in the weak echo.

Steps (processing, a process step, ST) in the signal processing method according to the first embodiment will now be described with reference to FIG. 3. Though the signal processing method according to the first embodiment relates to processing from strong-and-weak-echo distinction and output circuitry 12 of the signal processing apparatus according to the first embodiment, a part relating to processing in a stage preceding strong-and-weak-echo distinction and output circuitry 12 may also be regarded as being included in the signal processing method according to the first embodiment. The signal processing method according to the first embodiment derives a spectral parameter of a weak echo from electric power, a spectral width, and a Doppler velocity of a topographic-echo-processed echo resulting from removal of a topographic echo in a secondary echo and electric power, a spectral width, and a Doppler velocity of a topographic-echo-processed echo resulting from removal of a topographic echo in a primary echo, that are found from a reception signal of a reflected wave of pulsed undulation repeatedly transmitted into a space. The signal processing apparatus according to the first embodiment may naturally derive a spectral parameter of a strong echo.

Figure 3:
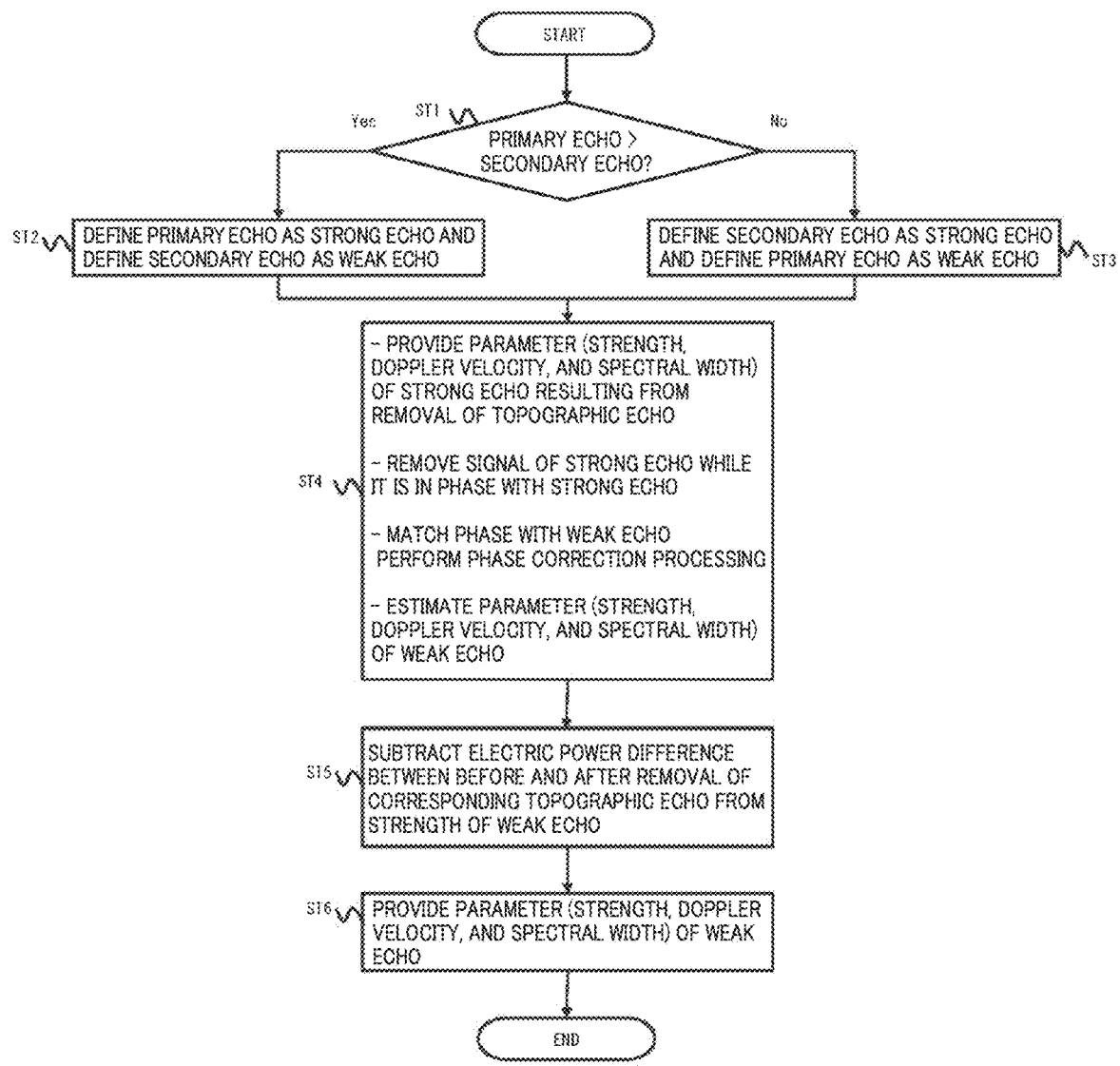
FIG. 3 is a flowchart of the signal processing method according to the first embodiment of the present invention.

In FIG. 3, a determination step (ST1) is a step of comparing a topographic-echo-processed secondary echo and a topographic-echo-processed primary echo with each other and categorizing the echoes into the strong echo and the weak echo. Preferably, the determination step (ST1) is a step of making determination for categorization into the strong echo and the weak echo by making at least one of a comparison of magnitude of electric power of the topographic-echo-processed echo and a comparison of magnitude of a spectral width of the topographic-echo-processed echo. Similarly to strong-and-weak-echo distinction and output circuitry 12, in comparison of magnitude of electric power, an echo higher in strength (electric power) is determined as the strong echo and an echo lower in strength (electric power) is determined as the weak echo. When magnitude of the spectral width is compared, an echo smaller in spectral width is determined as the strong echo and an echo larger in spectral width is determined as the weak echo. In the determination step (ST1), when both of comparison of magnitude of electric power and comparison of magnitude of the spectral width are made and results of both of them do not match, strength (electric power) of a multi-order echo may be included. Therefore, priority should be placed on the spectral width. In other words, in the determination step (ST1), determination for categorization into the strong echo and the weak echo should be made with priority being placed on a result of comparison of magnitude of the spectral width over a result of comparison of magnitude of electric power.

A step of determining a weak echo for a secondary echo (ST2) is a step of determining a secondary echo as the weak echo and determining a primary echo as a strong echo in the determination step. A step of determining a weak echo for a primary echo (ST3) is a step of determining a primary echo as the weak echo and determining a secondary echo as the strong echo in the determination step. A weak echo parameter determination step (ST4) is a step of setting as weak echo parameters, a strong-topographic-echo-removed reception signal resulting from removal of a topographic echo in a primary echo (or a secondary echo) determined as the strong echo and electric power of a topographic echo in the secondary echo (or the primary echo) determined as the weak echo in processing from the determination step (specifically, processing from ST2 (or ST3)).

In FIG. 3, a spectral parameter output step (ST6) is a step of providing as spectral parameters of the weak echo, electric power of the weak echo estimated from the reception signal in the weak echo region resulting from phase correction of the reception signal resulting from removal of a frequency component of the strong echo from the strong-topographic-echo-removed reception signal representing the weak echo parameter, the spectral width of the weak echo representing the weak echo parameter, and the Doppler velocity of the weak echo. Specifically, the spectral parameter output step (ST6) is a step of providing as a spectral parameter of the weak echo, electric power of the weak echo resulting from correction of electric power of the weak echo estimated from the reception signal in the weak echo region with electric power of the topographic echo representing the weak echo parameter in a weak echo strength correction step (ST5). In other words, the weak echo strength correction step (ST5) is a step of correcting electric power of the weak echo estimated from the reception signal in the weak echo region with electric power of the topographic echo representing the weak echo parameter.

The signal processing method according to the first embodiment may further include a spectral parameter determination step (not shown). The spectral parameter determination step is a step of setting as spectral parameters of the strong echo, electric power, the spectral width, and the Doppler velocity of the topographic-echo-processed echo of the primary echo (or the secondary echo) determined as the strong echo in the determination step (ST1).

In the weak echo strength correction step (ST5) in the signal processing method according to the first embodiment, electric power of the weak echo estimated from the reception signal in the weak echo region resulting from phase correction of the reception signal resulting from removal of the frequency component of the strong echo from the strong-topographic-echo-removed reception signal resulting from removal of the topographic echo in the primary echo (or the secondary echo) determined as the strong echo is corrected with electric power of the topographic echo representing the weak echo parameter. Therefore, in the weak echo strength correction step (ST5), the topographic echo in the secondary echo (or the primary echo) determined as the weak echo is removed from the secondary echo (or the primary echo) determined as the weak echo.

Therefore, the signal processing method according to the first embodiment is a method of performing signal processing for measuring an object by using a strong-topographic-echo-removed reception signal resulting from removal of a topographic echo in a primary echo (or a secondary echo) determined as the strong echo. Specifically, electric power of the weak echo estimated from a reception signal in the weak echo region resulting from phase correction of a reception signal resulting from removal of a frequency component of the strong echo from the strong-topographic-echo-removed reception signal resulting from removal of the topographic echo in the strong echo is corrected in the weak echo strength correction step (ST5). For correction, electric power of the topographic echo representing the weak echo parameter is used. Correction in the weak echo strength correction step (ST5) means removal of the topographic echo in the secondary echo or the primary echo determined as the weak echo from the secondary echo or the primary echo determined as the weak echo. Therefore, the signal processing method according to the first embodiment can suppress deterioration of a function to suppress the topographic echo in the weak echo and accuracy in estimation of strength of the weak echo.

Figure 4:
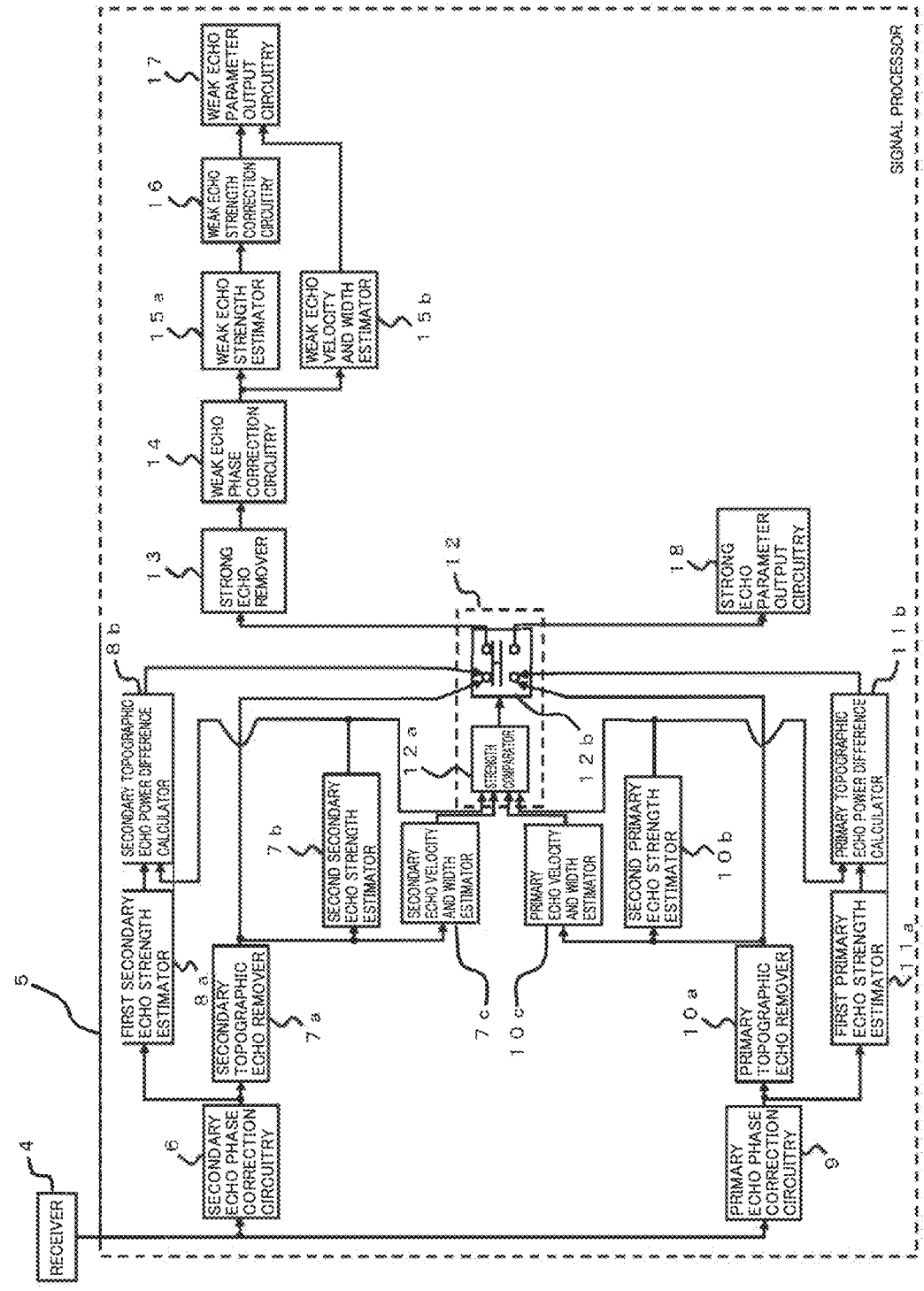
FIG. 4 is a functional block diagram of the signal processing apparatus according to the first embodiment of the present invention.

A configuration of a suitable functional block of the signal processing apparatus according to the first embodiment described with reference to FIGS. 1 and 2 will be described further with reference to FIG. 4. In the drawings of the present application, the same or corresponding elements have the same reference characters allotted and detailed description thereof may not be provided. In FIG. 4, a secondary topographic echo remover 7a, a second secondary echo strength estimator 7b, and a secondary echo velocity and width estimator 7c function as secondary echo processor 7. A first secondary echo strength estimator 8a and a secondary topographic echo power difference calculator 8b function as secondary topographic echo processor 8. A primary topographic echo remover 10a, a second primary echo strength estimator 10b, and a primary echo velocity and width estimator 10c function as primary echo processor 10. A first primary echo strength estimator 11a and a primary topographic echo power difference calculator 11b function as primary topographic echo processor 11. A weak echo strength estimator 15a and a weak echo velocity and width estimator 15b function as weak echo processor 15.

In the radar apparatus to which the signal processing apparatus according to the first embodiment is applied, transmitter 1 generates a reference signal on which a transmission signal is based and subjects the reference signal to pulse modulation, frequency conversion, or amplification. In phase modulation, a known code such as a pseudo random code or a systematic code can be used, and phase modulation is carried out to vary an initial phase every pulsed undulation. Transmission waves generated by transmitter 1 are radiated through transmission and reception switch 2 and aerial wire portion 3 (antenna portion 3) into a space and reflected by an object present in a beam direction, and some electric power of a reflected wave returns in a direction where aerial wire portion 3 (antenna portion 3) is present. Aerial wire portion 3 takes in a reflected wave that reaches as a reception wave, which is provided to receiver 4 via transmission and reception switch 2.

Receiver 4 generates a reception signal by performing demodulation processing on the reception wave. In the radar apparatus shown in FIG. 1, phase information of the reception signal should be extracted and hence phase demodulation processing is performed in receiver 4. In this phase demodulation processing, a reception signal resulting from frequency conversion of the reception wave into a low frequency is generated by mixing the reception wave provided through transmission and reception switch 2 and a signal used in frequency conversion in transmitter 1 and a part of the reference signal. At this time, receiver 4 divides the reference signal provided to receiver 4 into two signals, mixes one of the reference signals as it is with the reception wave, and mixes the other thereof with the reception wave with its phase being rotated by ninety degrees. Reception signals represented by a complex number having one signal as a real part and having the other signal as an imaginary part are thus obtained.

In the signal processing apparatus according to the first embodiment, secondary echo phase correction circuitry 6 generates a reception signal in a secondary echo region by phase correction in conformity with a secondary echo onto a reception signal sent from receiver 4, so as to cancel the initial phase of pulsed undulation transmitted on an occasion preceding by a prescribed number of occasions equal to or more than two (in the case of the secondary echo, preceding by two occasions, and in the case of a third-order echo, preceding by three occasions). Specifically, the reception signal experiences such phase variation for each pulse as being determined by a Doppler frequency of an object that reflects a wave and phase modulation by transmitter 1. Secondary echo phase correction circuitry 6 performs such phase correction processing as setting phase variation involved with phase modulation by transmitter 1 back to an original state with expectation for reception of the secondary echo.

Secondary topographic echo remover 7a detects by estimation, a low-frequency component (a component a Doppler velocity of which is around 0) within a frequency range that can be regarded as the topographic echo in the secondary echo, from the reception signal in the secondary echo region resulting from phase correction by secondary echo phase correction circuitry 6 and removes the low-frequency component. Specifically, a reception signal received after certain time after transmission of an ith pulse and before transmission of an i+1th pulse is denoted as $s_i$. A phase modulation quantity of the ith transmission pulse in transmitter 1 is denoted as $\phi_i$. At this time, a signal $s_{2nd,i}$ expressed in an expression (1) below is obtained by phase correction of reception signal $s_i$ with a phase modulation quantity $\phi_{i-1}$ in pulse transmission on an occasion preceding by two occasions (recent pulse transmission being defined as pulse transmission on an occasion preceding by one).

$$s_{2nd,i} = s_i e^{-j\phi_{i-1}} \quad (1)$$

Signal $s_{2nd,i}$ obtained in the expression (1) is called a "reception signal in the secondary echo region." The reception signal in the secondary echo region is provided to secondary topographic echo remover 7a and first secondary echo strength estimator 8a. Secondary topographic echo remover 7a performs processing for detecting the (secondary) topographic echo by Doppler frequency analysis and removes the (secondary) topographic echo. Secondary topographic echo remover 7a removes a topographic echo component by removing a Doppler frequency component a frequency (Doppler velocity) of which is in the vicinity of 0. Though a procedure for removing a topographic echo in a frequency domain is described by way of example, processing for removing the low-frequency component may be performed in a time domain. Secondary topographic echo remover 7a converts the reception signal in the secondary echo region provided from secondary echo phase correction circuitry 6 initially into a signal in the frequency domain by Fourier transform.

In succession, a component in the vicinity of a frequency (Doppler velocity) of 0 is removed as the Doppler frequency component where the topographic echo is present. Finally, the reception signal is recovered to a reception signal in the time domain by inverse Fourier transform, and the recovered reception signal in the secondary echo region is provided to second secondary echo strength estimator 7b, secondary echo velocity and width estimator 7c, and strong-and-weak-echo distinction and output circuitry 12.

First secondary echo strength estimator 8a calculates electric power of the reception signal in the secondary echo region subjected to phase correction by secondary echo phase correction circuitry 6. Similarly, second secondary echo strength estimator 7b calculates electric power of the topographic-echo-processed secondary echo resulting from removal of the topographic echo component by secondary topographic echo remover 7a. Secondary topographic echo power difference calculator 8b calculates electric power of the secondary topographic echo based on a difference in electric power of the reception signals between before and after secondary topographic echo remover 7a that are provided from first secondary echo strength estimator 8a and second secondary echo strength estimator 7b. Secondary echo velocity and width estimator 7c calculates by estimation, a Doppler velocity and a spectral width of the topographic-echo-processed secondary echo from the reception signal in the secondary echo region resulting from removal of the topographic echo component by secondary topographic echo remover 7a.

Specifically, first secondary echo strength estimator 8a and second secondary echo strength estimator 7b perform substantially the same signal processing except for difference in input. Strength (electric power) of the reception signal in the secondary echo region resulting from phase correction can be calculated as a zero-order moment of a spectrum generated by Fourier transform of the reception signal. Though secondary topographic echo remover 7a achieves recovery to the reception signal in the time domain by inverse Fourier transform and obtains the recovered reception signal in the secondary echo region, inverse Fourier transform is not necessary when processing by second secondary echo strength estimator 7b is performed in the frequency domain.

Strength (electric power) of a topographic-echo-unprocessed secondary echo which is strength (electric power) estimated by first secondary echo strength estimator 8a is provided to secondary topographic echo power difference calculator 8b, and strength (electric power) of the topographic-echo-processed secondary echo which is strength (electric power) estimated by second secondary echo strength estimator 7b is provided to secondary topographic echo power difference calculator 8b and strong-and-weak-echo distinction and output circuitry 12. Secondary echo velocity and width estimator 7c can make a calculation as primary and secondary moments of a spectrum generated by Fourier transform of the reception signal. Though secondary topographic echo remover 7a achieves recovery to the reception signal in the time domain by inverse Fourier transform and obtains the recovered reception signal in the secondary echo region, inverse Fourier transform is not necessary when processing by secondary echo velocity and width estimator 7c is performed in the frequency domain. The estimated Doppler velocity and spectral width are provided to strong-and-weak-echo distinction and output circuitry 12.

Secondary topographic echo power difference calculator 8b receives as inputs, strength (electric power) of the topographic-echo-unprocessed secondary echo which is strength (electric power) before removal of the secondary topographic echo provided from first secondary echo strength estimator 8a and strength (electric power) of the topographic-echo-processed secondary echo which is strength (electric power) resulting from removal of the secondary topographic echo provided from second secondary echo strength estimator 7b, and calculates a difference therebetween. Since this difference is a difference in strength (electric power) between before and after topographic echo removal processing, it can be considered as strength (electric power) of the secondary topographic echo. The calculated difference in electric power of the secondary topographic echo (strength (electric power) of the secondary topographic echo) is provided to strong-and-weak-echo distinction and output circuitry 12.

Primary echo phase correction circuitry 9, primary topographic echo remover 10a, first primary topographic echo strength estimator 11a, second primary echo strength estimator 10b, primary echo velocity and width estimator 10c, and primary topographic echo power difference calculator 11b will now be described. Since what is handled is merely changed to the primary echo and basic processing contents are the same as in the case of the secondary echo, detailed description may not be provided.

Primary echo phase correction circuitry 9 obtains a reception signal in the primary echo region by carrying out phase correction in conformity with the primary echo on a reception signal sent from receiver 4 so as to cancel an initial phase of recently transmitted pulsed undulation. Primary topographic echo remover 10a detects by estimation, a low-frequency component (a component a Doppler velocity of which is around 0) within a frequency range that can be regarded as the topographic echo in the primary echo, of the reception signal in the primary echo region resulting from phase correction by primary echo phase correction circuitry 9 and removes the low-frequency component.

Specifically, primary echo phase correction circuitry 9 performs phase correction processing to set phase variation involved with phase modulation by transmitter 1 back to an original state with expectation for reception of the primary echo. A reception signal received after certain time after transmission of an ith pulse and before transmission of an i+1th pulse is denoted as $s_i$. A phase modulation quantity of the ith transmission pulse in transmitter 1 is denoted as $\phi_i$. At this time, a signal $s_{1st,i}$ expressed in an expression (2) below is obtained by phase correction onto reception signal $s_i$, with phase modulation quantity $\phi_i$ in transmission of pulse on an occasion preceding by one occasion, that is, recent transmission of the pulse. Signal $s_{1st,i}$ obtained in the expression (2) is called a "reception signal in the primary echo region."

$$s_{1st,i} = s_i e^{-j\phi_i} \qquad (2)$$

First primary echo strength estimator 11a calculates electric power of the reception signal in the primary echo region resulting from phase correction by primary echo phase correction circuitry 9. Similarly, second primary echo strength estimator 10b calculates electric power of the topographic-echo-processed primary echo resulting from removal of the topographic echo component by primary topographic echo remover 10a. Primary topographic echo power difference calculator 11b calculates electric power of the primary topographic echo based on a difference in electric power of the reception signals between before and after primary topographic echo remover 10a that are provided from first primary echo strength estimator 11a and second primary echo strength estimator 10b. Primary echo velocity and width estimator 10c calculates by estimation, a Doppler velocity and a spectral width of the topographic-echo-processed primary echo based on the reception signal in the primary echo region resulting from removal of the topographic echo component by primary topographic echo remover 10a.

Strong-and-weak-echo distinction and output circuitry 12 includes a strength comparator 12a and a strong-and-weak-echo switch 12b and tags an echo higher in strength as the strong echo and tags an echo lower in strength as the weak echo in accordance with a result of comparison of strength of the primary echo and the secondary echo determined by strength comparator 12a, and thereafter strong-and-weak-echo switch 12b provides relevant information to strong echo parameter output circuitry 18 or strong echo remover 13. Details will be described below.

Strong-and-weak-echo distinction and output circuitry 12 includes strength comparator 12a and determines one of the primary echo and the secondary echo as the strong echo and determines the other as the weak echo based on electric power of the topographic-echo-processed secondary echo estimated by second secondary echo strength estimator 7b, the Doppler velocity and the spectral width of the topographic-echo-processed secondary echo estimated by secondary echo velocity and width estimator 7c, electric power of the topographic-echo-processed primary echo estimated by second primary echo strength estimator 10b, and the Doppler velocity and the spectral width of the topographic-echo-processed primary echo estimated by primary echo velocity and width estimator 10c.

Strength comparator 12a provides information that represents relation in magnitude between the primary echo and the secondary echo based on electric power of the topographic-echo-processed secondary echo estimated by second secondary echo strength estimator 7b, the Doppler velocity and the spectral width of the topographic-echo-processed secondary echo estimated by secondary echo velocity and width estimator 7c, electric power of the topographic-echo-processed primary echo estimated by second primary echo strength estimator 10b, and the Doppler velocity and the spectral width of the topographic-echo-processed primary echo estimated by primary echo velocity and width estimator 10c. Strong-and-weak-echo distinction and output circuitry 12 includes strong-and-weak-echo switch 12b, and upon receiving a result of determination by strength comparator 12a, it sends a weak echo parameter to strong echo remover 13 and sends a spectral parameter of the strong echo to strong echo parameter output circuitry 18. The weak echo parameter is a parameter from which a spectral parameter of the weak echo is derived.

Upon receiving the result of determination by strength comparator 12a, strong-and-weak-echo switch 12b provides to strong echo parameter output circuitry 18 as the spectral parameter of the strong echo, any one of combination of "the reception signal in the secondary echo region (a secondary echo reception signal) resulting from removal of the topographic echo component by secondary topographic echo remover 7a and electric power of the secondary topographic echo estimated by secondary topographic echo power difference calculator 8b," "electric power of the topographic-echo-processed secondary echo (electric power of the secondary echo reception signal) estimated by second secondary echo strength estimator 7b," and "the Doppler velocity and the spectral width of the topographic-echo-processed secondary echo estimated by secondary echo velocity and width estimator 7c" and combination of "the reception signal in the primary echo region (a primary echo reception signal) resulting from removal of the topographic echo component by primary topographic echo remover 10a and electric power of the primary topographic echo estimated by primary topographic echo power difference calculator 11b," "electric power of the topographic-echo-processed primary echo (electric power of the primary echo reception signal) estimated by second primary echo strength estimator 10b," and "the Doppler velocity and the spectral width of the topographic-echo-processed primary echo estimated by primary echo velocity and width estimator 10c." Strong-and-weak-echo switch 12b provides the other as the weak echo parameter to strong echo remover 13.

For the strong echo, strong-and-weak-echo distinction and output circuitry 12 provides the spectral parameter of the strong echo including echo strength (electric power), the Doppler velocity, and the spectral width to strong echo parameter output circuitry 18, and for the weak echo, it provides a reception signal (resulting from removal of the topographic echo in the strong echo) in phase with the strong echo which represents the weak echo parameter and a topographic echo power difference of the weak echo (electric power of the topographic echo in the weak echo). Upon receiving the spectral parameters of the strong echo, strong echo parameter output circuitry 18 provides strength (signal electric power), the Doppler velocity, and the spectral width of the primary echo or the secondary echo determined as the strong echo by strong-and-weak-echo distinction and output circuitry 12.

Specifically, strength comparator 12a receives from second secondary echo strength estimator 7b, strength (electric power) of the topographic-echo-processed secondary echo which is the strength (electric power) of the secondary echo resulting from removal of the secondary topographic echo, receives from second primary echo strength estimator 10b, strength (electric power) of the topographic-echo-processed primary echo which is strength (electric power) of the primary echo resulting from removal of the primary topographic echo, and compares magnitude of strength. Though magnitude of strength can thus directly be determined based on electric power of an echo, strength can be compared also based on magnitude of the spectral width.

In this case, the spectral width of the topographic-echo-processed secondary echo from secondary echo velocity and width estimator 7c and the spectral width of the topographic-echo-processed primary echo from primary echo velocity and width estimator 10c are received as inputs, and an echo smaller in spectral width is defined as the strong echo and an echo larger in spectral width is defined as the weak echo. Determination as to strength (electric power) and determination as to the spectral width of the echo can also be used together. When results of determination as to strength (electric power) and the spectral width of the echo are different, strength (electric power) of the echo may include strength of a multi-order echo at this time point and hence priority is placed on the result of determination as to the spectral width.

Upon receiving the weak echo parameter, strong echo remover 13 estimates and removes a frequency component of the strong (weather) echo from the strong-topographic-echo-removed reception signal which is the reception signal resulting from removal of the topographic echo in the secondary echo or the primary echo determined as the strong echo. Specifically, strong echo remover 13 removes the strong echo component from a spectrum of the reception signal in phase with the strong echo provided from strong-and-weak-echo distinction and output circuitry 12. At this time, when the output reception signal is a time signal, Fourier transform is carried out to convert the reception signal into a signal in the frequency domain. Since the topographic echo has already been removed from the spectrum of the reception signal in phase with the strong echo, a component with a significant peak is considered as the strong echo component. Then, by detecting a peak in the spectrum and removing a signal equal to or higher than a noise level including a position of that peak, the strong echo can be removed. In a different method, the frequency component of the strong echo can be removed by subjecting the spectrum to a notch filter for which a coefficient for such a prescribed spectral width as encompassing a spectral width of the strong echo is set to 0 and a coefficient other than that is set to 1 with the peak position being defined as the center. The reception signal resulting from removal of the frequency component of the strong echo which is the reception signal (spectrum) resulting from removal of the strong echo is provided to weak echo phase correction circuitry 14. The spectral width of the strong echo (a width of a signal equal to or higher than the noise level) or a width represented by the coefficient 0 and the coefficient 1 of the notch filter can also similarly be provided to weak echo phase correction circuitry 14.

Weak echo phase correction circuitry 14 derives the reception signal in the weak echo region by phase correction to the phase of the weak echo, of the reception signal resulting from removal of the frequency component of the strong echo by strong echo remover 13. Specifically, weak echo phase correction circuitry 14 receives a reception signal which is in phase with the strong echo and results from removal of the strong echo component from strong echo remover 13 and performs processing for being in phase with the weak echo. For example, the strong echo is assumed as the secondary echo and the reception signal is expressed as a signal $s'_{2nd,i}$. In order to convert this reception signal to a primary echo $s'_{1st,i}$ that is a weak echo, as shown in an expression (3), multiplication by a phase modulation quantity that cancels a phase modulation quantity in conformity with the secondary echo and further a phase modulation quantity for being in phase with the primary echo is made. Signal $s'_{1st,i}$ obtained in the expression (3) is called the "reception signal in the weak echo region." The calculated reception signal in the weak echo region is provided to weak echo strength estimator 15a and weak echo velocity and width estimator 15b. When the spectral width of the strong echo (a width of a signal equal to or higher than the noise level) or a width represented by the coefficient 0 and the coefficient 1 of the notch filter is provided from strong echo remover 13, such a value can also be provided to weak echo strength estimator 15a.

$$s'_{1st,i}=s'_{2nd,i}e^{j\phi_{i-1}}e^{-\phi_i} \quad (3)$$

Weak echo strength estimator 15a calculates electric power of the weak echo in the reception signal in the weak echo region provided from weak echo phase correction circuitry 14. Specifically, weak echo strength estimator 15a calculates by estimation, strength (electric power) of the weak echo from the provided reception signal in the weak echo region. The estimation method is the same as the method by first secondary echo strength estimator 8a, second secondary echo strength estimator 7b, first primary echo strength estimator 11a, and second primary echo strength estimator 10b. Obtained strength (electric power) of the weak echo is provided to weak echo strength correction circuitry 16. When strong echo remover 13 provides input of the spectral width of the strong echo (a width of a signal equal to or higher than the noise level) or a ratio of the coefficient 0 and the coefficient 1 of the notch filter, strength (electric power) of the weak echo component removed together at the time of removal of the strong echo can be corrected with such a value and strength (electric power) of the weak echo can more accurately be found. Specifically, strength (electric power) of the weak echo is multiplied by a/(a−b), with a representing the width of the entire spectrum (a Nyquist width) and b representing the spectral width of the strong echo. When the notch filter is applied, strength (electric power) of the weak echo is multiplied by (d+c)/d, with c representing a width of a region of the coefficient 0 and d representing a width of a region of the coefficient 1.

Weak echo velocity and width estimator 15b calculates by estimation, the Doppler velocity and the spectral width of the weak echo based on the reception signal in the weak echo region provided from weak echo phase correction circuitry 14. Specifically, weak echo velocity and width estimator 15b calculates by estimation, the Doppler velocity and the spectral width of the provided weak echo based on the reception signal in the weak echo region. By using a lag (R) of an autocorrelation value found by inverse Fourier transform of a spectrum of the reception signal in the weak echo region, the Doppler velocity and the spectral width are calculated based on an angle of deviation arg[R(1)] of a lag 1 and a division R(1)/R(2) of lag 1 by a lag 2. This result is provided to weak echo parameter output circuitry 17.

Weak echo strength correction circuitry 16 corrects electric power of the weak echo estimated by weak echo strength estimator 15a with electric power of the topographic echo in the primary echo or electric power of the topographic echo in the secondary echo determined as the weak echo by strong-and-weak-echo distinction and output circuitry 12 and provides corrected electric power. Specifically, weak echo strength correction circuitry 16 functions to remove the topographic echo in the weak echo (weak topographic echo removal). Correction with electric power of the topographic echo in the primary echo or electric power of the topographic echo in the secondary echo determined as the weak echo means processing equivalent to weak topographic echo removal.

At the time point before signal processing in weak echo strength correction circuitry 16, the topographic echo and the strong echo in the strong echo region have been removed from the reception signal in the weak echo region and phase relation has been disturbed. An effect equivalent to removal of the topographic echo is obtained not by processing for removing the topographic echo as in secondary topographic echo remover 7a or primary topographic echo remover 10a but by correction (subtraction) of strength (electric power) of the weak echo by using an amount of suppression of the topographic echo calculated in advance by secondary topographic echo power difference calculator 8b or primary topographic echo power difference calculator 11b. This result is provided to weak echo parameter output circuitry 17.

Weak echo parameter output circuitry 17 provides as spectral parameters of the weak echo, (corrected) electric power of the weak echo provided from weak echo strength correction circuitry 16 and the Doppler velocity and the spectral width of the weak echo provided from weak echo velocity and width estimator 15b. Specifically, weak echo parameter output circuitry 17 provides as the spectral parameters of the weak echo, the spectral parameters (strength (electric power), the Doppler velocity, and the spectral width) provided from weak echo strength correction circuitry 16 and weak echo velocity and width estimator 15b and primary echo/secondary echo categorization.

Suitable steps (processing, process steps, ST) in the signal processing method according to the first embodiment described with reference to FIG. 3 will be described further with reference to FIG. 5. In the drawings of the present application, the same or corresponding elements have the same reference characters allotted and detailed description thereof may not be provided. Though the signal processing method according to the first embodiment is described as processing relating to processing from strong-and-weak-echo distinction and output circuitry 12 of the signal processing apparatus according to the first embodiment, a part relating to processing in a stage preceding strong-and-weak-echo distinction and output circuitry 12 may also be regarded as being included in the signal processing method according to the first embodiment as described previously.

Figure 5:
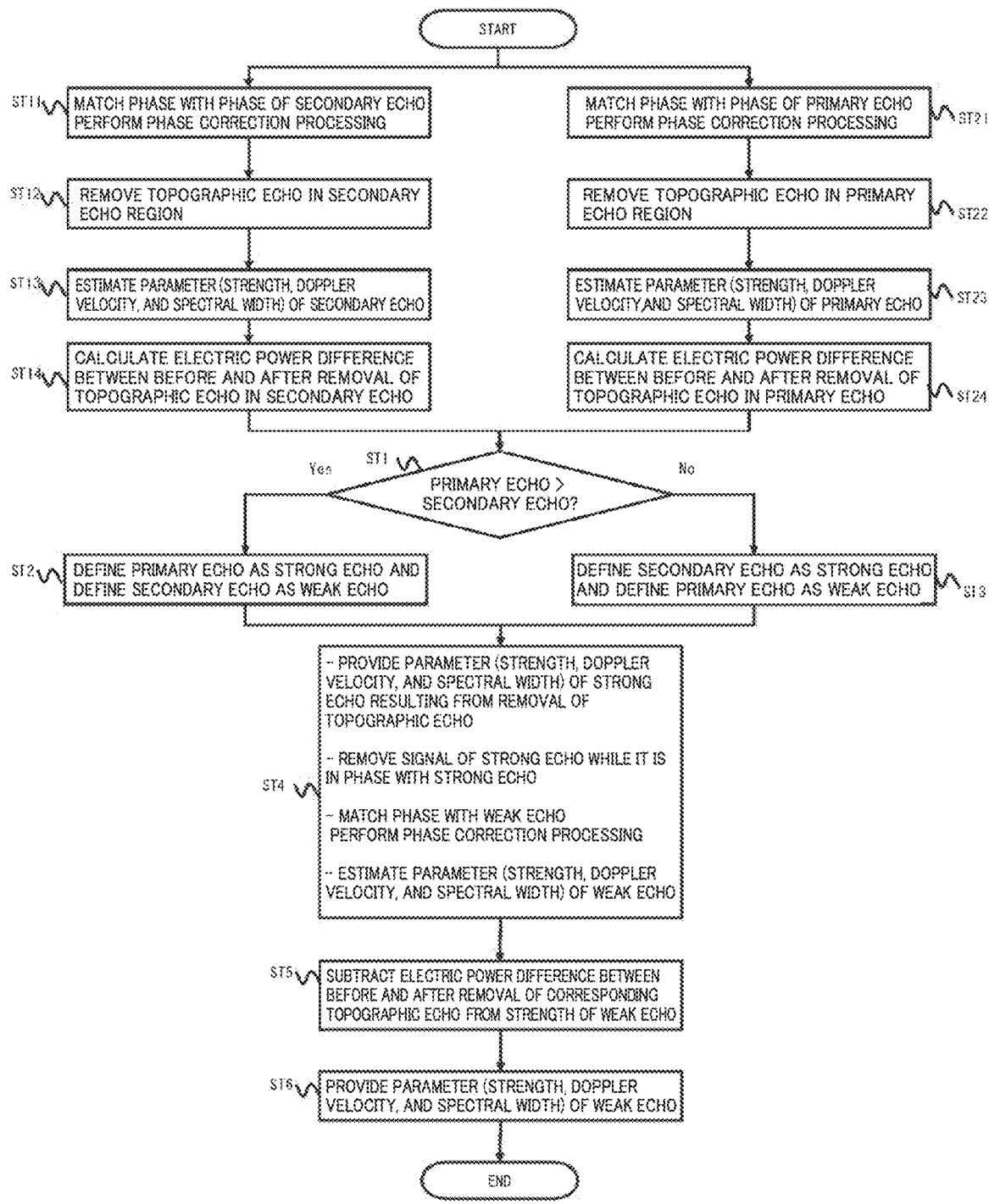
FIG. 5 is a flowchart of the signal processing method according to the first embodiment of the present invention.

In FIG. 5, phase correction processing for being in phase with the secondary echo is performed on the reception signal (ST11), the topographic echo in the secondary echo region is removed (ST12), the spectral parameter (strength, the Doppler velocity, and the spectral width) of the secondary echo is estimated (ST13), and a difference in electric power between before and after removal of the topographic echo in the secondary echo is calculated (ST14). Phase correction processing for being in phase with the primary echo is performed on the reception signal (ST21), the topographic echo in the primary echo region is removed (ST22), the spectral parameter (strength, the Doppler velocity, and the spectral width) of the primary echo is estimated (ST23), and a difference in electric power between before and after removal of the topographic echo in the primary echo is calculated (ST24). In FIG. 5, steps from ST11 to ST14 and processing from ST21 to ST24 may be performed with their order being reshuffled or may be performed in parallel.

As shown in FIG. 3, the primary echo and the secondary echo are compared with each other in strength (ST1). When the primary echo is stronger, the primary echo is tagged as the strong echo and the secondary echo is tagged as the weak echo (ST2). When the primary echo is weaker, the secondary echo is tagged as the strong echo and the primary echo is tagged as the weak echo (ST3). The spectral parameter (strength, the Doppler velocity, and the spectral width) of the strong echo from which the topographic echo has been removed is provided (ST4). The strong echo component is removed from a signal in phase with the strong echo (ST4). Phase correction processing for being in phase with the weak echo is performed (ST4). The spectral parameter (strength, the Doppler velocity, and the spectral width) of the weak echo is estimated (ST4). A difference in electric power between before and after removal of a corresponding topographic echo is subtracted from strength of the weak echo (ST5). The spectral parameter (strength, the Doppler velocity, and the spectral width) of the weak echo is output (ST6), and the process ends.

As set forth above, with the signal processing apparatus and the signal processing method according to the first embodiment, strength (electric power) of the topographic echo is estimated in advance by topographic echo removal processing, and in a subsequent stage, that value is used to correct strength of the weak echo. Therefore, without influence by disturbance of the phase by removal of the topographic echo in the strong echo, the topographic echo in the weak echo can be removed. Therefore, the signal processing apparatus and the signal processing method according to the first embodiment can be free from deterioration of performance in suppression of the topographic echo in the weak echo and can also suppress deterioration in accuracy in estimation of a spectral parameter (strength) of the weak echo.

Second Embodiment

A signal processing apparatus and a signal processing method according to a second embodiment of the present invention will be described with reference to FIGS. 1 and 6 to 9. In particular, the signal processing method according to the second embodiment will be described with reference to FIGS. 7 and 9. FIG. 1 is the functional block diagram of the radar apparatus (the observation apparatus or the measurement apparatus) to which the signal processing apparatus according to the second embodiment is applied, with the configuration being the same as in the first embodiment. In the drawings of the present application, the same or corresponding elements have the same reference characters allotted and detailed description thereof may not be provided. A portion common to that in the first embodiment may not be described.

Figure 6:
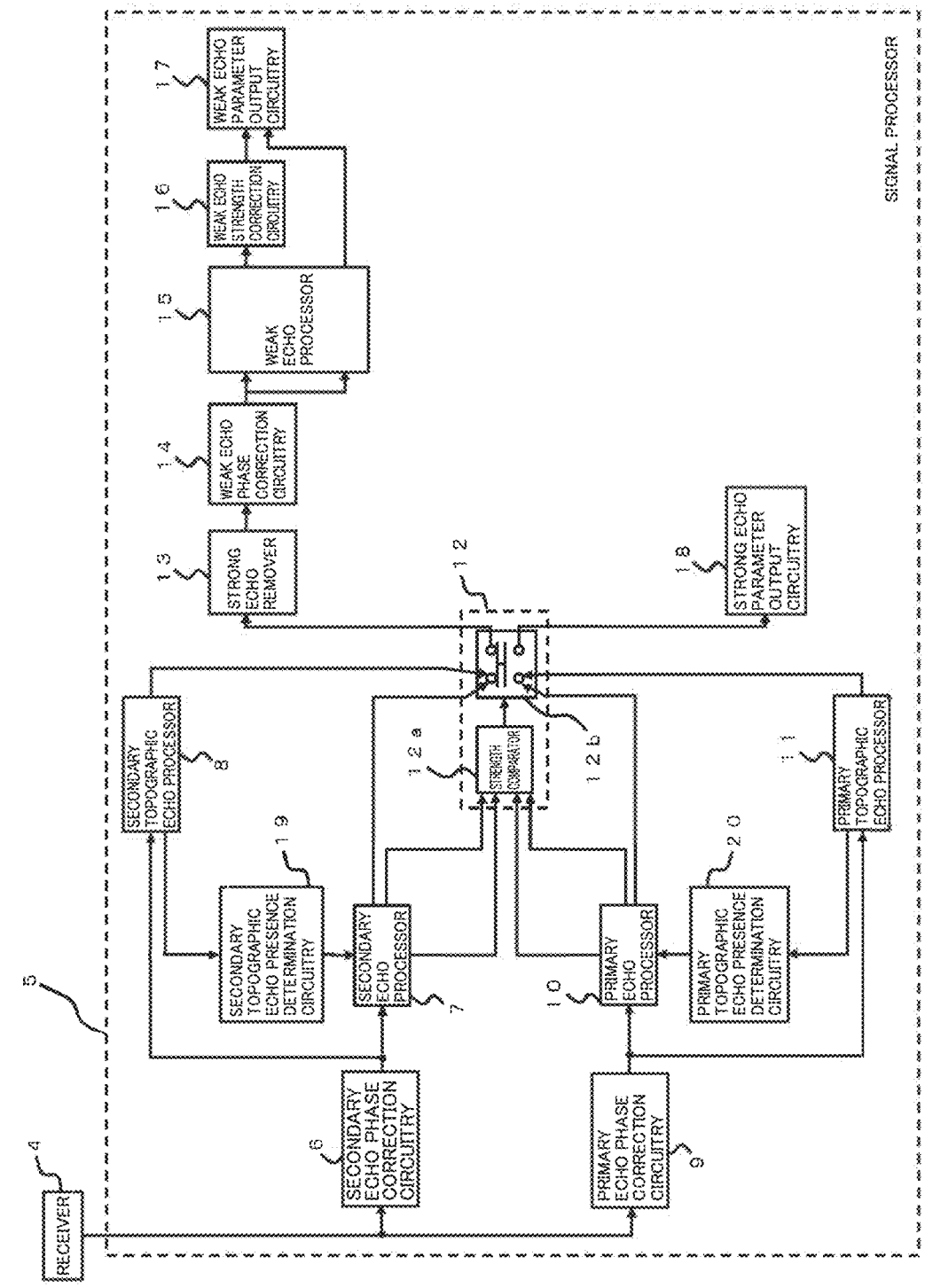
FIG. 6 is a functional block diagram of a signal processing apparatus according to a second embodiment of the present invention.

In FIG. 6, secondary topographic echo presence determination circuitry 19 determines presence of a secondary topographic echo based on electric power of the secondary topographic echo calculated by secondary topographic echo processor 8. Primary topographic echo presence determination circuitry 20 determines presence of a primary topographic echo based on electric power of the primary topographic echo calculated by primary topographic echo processor 11. In the signal processing apparatus according to the first embodiment, initially, processing for removing a topographic echo is performed in each of the primary echo region and the secondary echo region. If a topographic echo is present in neither of the regions or in one of them, phase relation of another echo in a reception signal is not disturbed by not performing processing for removing the topographic echo, and hence improvement in accuracy in estimation of a spectral parameter can further be expected. To that end, the signal processing apparatus according to the second embodiment can be concluded as further including secondary topographic echo presence determination circuitry 19 and primary topographic echo presence determination circuitry 20 in the signal processing apparatus according to the first embodiment.

As shown in FIG. 6, in the signal processing apparatus according to the second embodiment, when secondary topographic echo presence determination circuitry 19 determines that there is no secondary topographic echo, secondary echo processor 7 estimates (determines) electric power of a topographic-echo-unprocessed secondary echo estimated from a reception signal in the secondary echo region as electric power of a topographic-echo-processed secondary echo and estimates (determines) a spectral width of the topographic-echo-unprocessed secondary echo and a Doppler velocity of the topographic-echo-unprocessed secondary echo as the spectral width of the topographic-echo-processed secondary echo and the Doppler velocity of the topographic-echo-processed secondary echo. The topographic-echo-processed secondary echo can be concluded as a secondary echo resulting from removal of a topographic echo or a secondary echo originally free from a topographic echo.

Similarly, in the signal processing apparatus according to the second embodiment, when primary topographic echo presence determination circuitry 20 determines that there is no primary topographic echo, primary echo processor 10 estimates (determines) electric power of a topographic-echo-unprocessed primary echo estimated from a reception signal in the primary echo region as electric power of a topographic-echo-processed primary echo and estimates (determines) a spectral width of the topographic-echo-unprocessed primary echo and a Doppler velocity of the topographic-echo-unprocessed primary echo as the spectral width of the topographic-echo-processed primary echo and the Doppler velocity of the topographic-echo-processed primary echo. The topographic-echo-processed primary echo can be concluded as a primary echo resulting from removal of a topographic echo or a primary echo originally free from a topographic echo.

In the signal processing apparatus according to the second embodiment, when an echo determined as the weak echo by strong-and-weak-echo distinction and output circuitry 12 is the secondary echo and when secondary topographic echo presence determination circuitry 19 determines that there is no secondary topographic echo or when an echo determined as the weak echo by strong-and-weak-echo distinction and output circuitry 12 is the primary echo and when primary topographic echo presence determination circuitry 20 determines that there is no primary topographic echo, weak echo strength correction circuitry 16 does not disturb phase relation with electric power estimated by weak echo processor 15 being set as electric power of the weak echo. In other words, in such a case, output from weak echo processor 15 can be concluded as being sent as it is to weak echo parameter output circuitry 17 without operating weak echo strength correction circuitry 16.

Furthermore, in the signal processing apparatus according to the second embodiment, when an echo determined as the strong echo by strong-and-weak-echo distinction and output circuitry 12 is determined by secondary topographic echo presence determination circuitry 19 or primary topographic echo presence determination circuitry 20 as being free from a secondary topographic echo or a primary topographic echo, strong-and-weak-echo distinction and output circuitry 12 provides to strong echo remover 13 as the weak echo parameter, a reception signal of a secondary echo or a primary echo determined as the strong echo instead of the strong-topographic-echo-removed reception signal. Strong echo remover 13 generates a reception signal resulting from removal of a frequency component of the strong echo from the reception signal of the secondary echo or the primary echo determined as the strong echo that represents the weak echo parameter.

A method of tagging of echoes as strong and weak echoes based on strength of the primary echo and the secondary echo and determination of an order of removal of an echo by strong-and-weak-echo distinction and output circuitry 12 (strength comparator 12) is described so far. When only one of the secondary topographic echo and the primary topographic echo is present, however, strong-and-weak-echo distinction and output circuitry 12 (strength comparator 12a) can determine an echo including the topographic echo as the strong echo and determine an echo not including the topographic echo as the weak echo. Since a criterion for determination of strength by strength comparator 12a is presence of a topographic echo, strength comparator 12a may directly receive information on presence of a topographic echo from secondary topographic echo presence determination circuitry 19 and primary topographic echo presence determination circuitry 20. By such determination by strong-and-weak-echo distinction and output circuitry 12 (strength comparator 12a) based on presence of a topographic echo, processing for removing a topographic echo in the weak echo region does not have to be performed and influence onto the weak echo can be reduced. This is also applicable to the signal processing method according to the second embodiment.

Thus, according to the signal processing apparatus in the second embodiment, whether or not a topographic echo is present is determined, and when the topographic echo is determined as being absent, a signal that is not subjected to topographic echo removal processing is used to perform processing in a subsequent stage. Therefore, phase relation of a signal is not collapsed in topographic echo removal processing or a weather echo is not attenuated, and a spectral parameter can accurately be found.

The signal processing apparatus according to the second embodiment may be implemented as a special configuration (a modification) as in an example where weak echo strength correction circuitry 16 is not operated or an example where weak echo strength correction circuitry 16 is not provided. In the signal processing apparatus (modification) according to the second embodiment as well, when secondary topographic echo presence determination circuitry 19 determines that there is no secondary topographic echo, secondary echo processor 7 estimates (determines) electric power of a topographic-echo-unprocessed secondary echo estimated from the reception signal in the secondary echo region as electric power of a topographic-echo-processed secondary echo and estimates (determines) a spectral width of the topographic-echo-unprocessed secondary echo and a Doppler velocity of the topographic-echo-unprocessed secondary echo as the spectral width of the topographic-echo-processed secondary echo and the Doppler velocity of the topographic-echo-processed secondary echo.

Similarly, in the signal processing apparatus (modification) according to the second embodiment as well, when primary topographic echo presence determination circuitry 20 determines that there is no primary topographic echo, the primary echo processor estimates (determines) electric power of a topographic-echo-unprocessed primary echo estimated from the reception signal in the primary echo region as electric power of a topographic-echo-processed primary echo and estimates (determines) a spectral width of the topographic-echo-unprocessed primary echo and a Doppler velocity of the topographic-echo-unprocessed primary echo as the spectral width of the topographic-echo-processed primary echo and the Doppler velocity of the topographic-echo-processed primary echo.

In the signal processing apparatus (modification) according to the second embodiment, when an echo determined as the weak echo by strong-and-weak-echo distinction and output circuitry 12 is the secondary echo and when secondary topographic echo presence determination circuitry 19 determines that there is no secondary topographic echo or when an echo determined as the weak echo by strong-and-weak-echo distinction and output circuitry 12 is the primary echo and when primary topographic echo presence determination circuitry 20 determines that there is no primary topographic echo, weak echo processor 15 should only estimate electric power of the weak echo, the spectral width of the weak echo, and the Doppler velocity of the weak echo from the reception signal in the weak echo region. By allowing an operation with conditions being reduced, weak echo strength correction circuitry 16 does not have to be provided.

Furthermore, in the signal processing apparatus (modification) according to the second embodiment, when an echo determined as the strong echo by strong-and-weak-echo distinction and output circuitry 12 is determined as being free from the secondary topographic echo or the primary topographic echo by secondary topographic echo presence determination circuitry 19 or primary topographic echo presence determination circuitry 20, strong-and-weak-echo distinction and output circuitry 12 provides as the weak echo parameter, the reception signal of the secondary echo or the primary echo determined as the strong echo instead of the strong-topographic-echo-removed reception signal, and the strong echo remover generates a reception signal resulting from removal of a frequency component of the strong echo from the reception signal of the secondary echo or the primary echo determined as the strong echo that represents the weak echo parameter.

Steps (processing, a process step, ST) in the signal processing method according to the second embodiment will now be described with reference to FIG. 7. Though the signal processing method according to the second embodiment relates to processing from strong-and-weak-echo distinction and output circuitry 12 of the signal processing apparatus according to the second embodiment, a part relating to processing in a stage preceding strong-and-weak-echo distinction and output circuitry 12 may also be regarded as being included in the signal processing method according to the second embodiment.

The signal processing method according to the second embodiment derives spectral parameters of the weak echo from electric power, a spectral width, and a Doppler velocity of an echo resulting from topographic echo processing (or resulting from processing of a topographic echo originally free from a topographic echo) resulting from removal of a topographic echo in the secondary echo and electric power, a spectral width, and a Doppler velocity of an echo resulting from topographic echo processing (or resulting from processing of a topographic echo originally free from a topographic echo) resulting from removal of a topographic echo in the primary echo, that are found from a reception signal of a reflected wave of pulsed undulation repeatedly transmitted into a space. The signal processing apparatus according to the second embodiment may naturally derive spectral parameters of a strong echo. In the present application, an echo resulting from topographic echo processing does not have to be subjected to determination as to presence of a topographic echo, and consequently an echo originally free from a topographic echo may also be regarded as an echo resulting from topographic echo processing.

Figure 7:
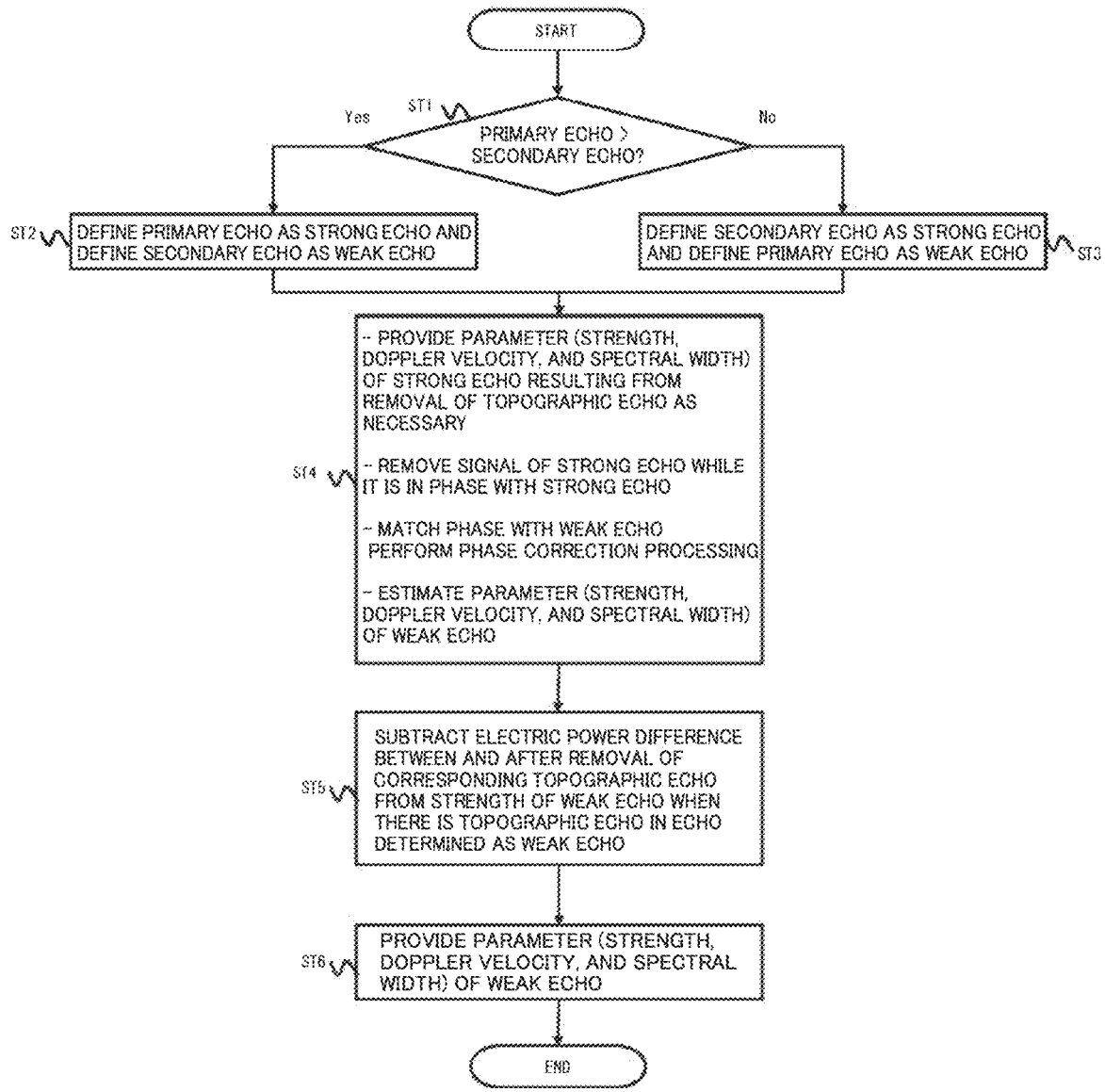
FIG. 7 is a flowchart of a signal processing method according to the second embodiment of the present invention.

In FIG. 7, the weak echo parameter determination step (ST4) is a step of setting a strong-topographic-echo-removed reception signal and electric power of a topographic echo in a secondary echo or a primary echo determined as the weak echo in the determination step (ST1) as weak echo parameters, setting as the strong-topographic-echo-removed reception signal, a reception signal before removal of a topographic echo in the secondary echo or the primary echo determined as the strong echo (processing different from that in the signal processing method according to the first embodiment) for the sake of convenience when the primary echo or the secondary echo determined as the strong echo in the determination step (ST4) is the primary echo free from the topographic echo or the secondary echo free from the topographic echo, and setting as the strong-topographic-echo-removed reception signal, when there is a topographic echo in the primary echo or the secondary echo determined as the strong echo, an echo resulting from removal thereof (processing similar to that in the signal processing method according to the first embodiment).

In FIG. 7, in the spectral parameter output step (ST6), when there is a topographic echo in the secondary echo or the primary echo determined as the weak echo, electric power of the weak echo estimated from the reception signal in the weak echo region is set as electric power of the weak echo resulting from correction with electric power of the topographic echo representing the weak echo parameter in the weak echo strength correction step (ST5) and that electric power is provided as the spectral parameter of the weak echo.

Naturally, when there is no topographic echo in the secondary echo or the primary echo determined as the weak echo, the weak echo strength correction step (ST5) is not performed, and in the spectral parameter output step (ST6), electric power of the weak echo estimated from the reception signal in the weak echo region is provided as it is. In other words, similarly to the signal processing apparatus (modification) according to the second embodiment, the weak echo strength correction step (ST5) does not have to be performed. In the spectral parameter output step (ST6), when there is no topographic echo in the secondary echo or the primary echo determined as the weak echo, electric power of the weak echo, the spectral width of the weak echo representing the weak echo parameter, and the Doppler velocity of the weak echo are provided as the spectral parameters of the weak echo.

Figure 8:
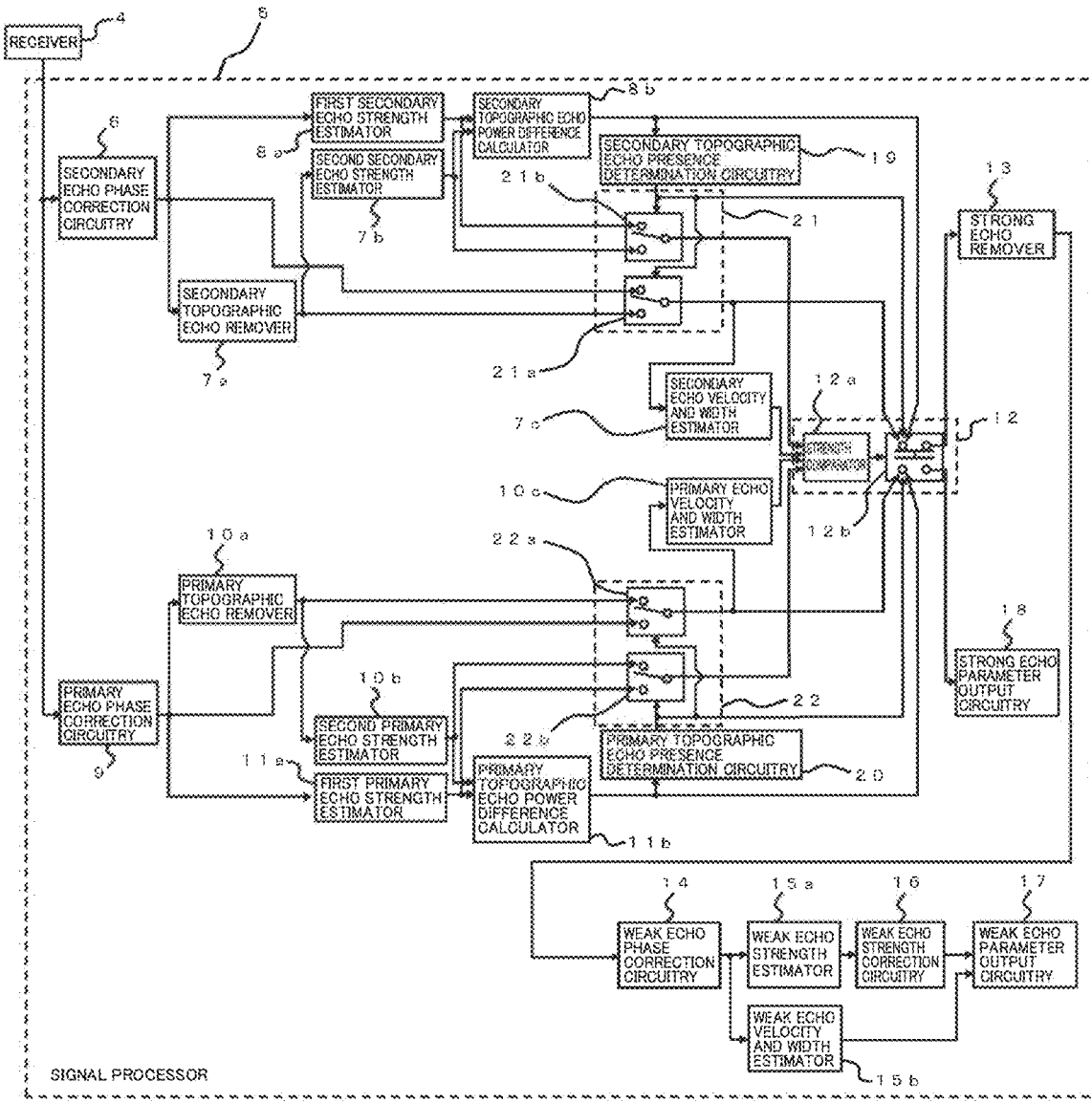
FIG. 8 is a functional block diagram of the signal processing apparatus according to the second embodiment of the present invention.

A configuration of a suitable functional block of the signal processing apparatus according to the second embodiment described with reference to FIGS. 1 and 6 will be described further with reference to FIG. 8. In the drawings of the present application, the same or corresponding elements have the same reference characters allotted and detailed description thereof may not be provided. In FIG. 8, a secondary topographic echo switch 21 includes a secondary echo reception signal switch 21a and a secondary echo strength switch 21b. A primary topographic echo switch 22 includes a primary echo reception signal switch 22a and a primary echo strength switch 22b. Secondary topographic echo switch 21 reflects a result of determination by secondary topographic echo presence determination circuitry 19. Similarly, primary topographic echo switch 22 reflects a result of determination by primary topographic echo presence determination circuitry 20.

Signal processor 5 shown in FIG. 8 additionally includes secondary topographic echo presence determination circuitry 19 and secondary topographic echo switch 21 in the configuration of signal processor 5 shown in FIG. 4. Secondary topographic echo switch 21 receives as inputs, strength (electric power) of a secondary echo from first secondary echo strength estimator 8a, strength (electric power) of the secondary echo from second secondary echo strength estimator 7b, a secondary echo reception signal from secondary echo phase correction circuitry 6, and a reception signal of a secondary echo resulting from removal of a topographic echo from secondary topographic echo remover 7a.

Similarly, signal processor 5 shown in FIG. 8 additionally includes primary topographic echo presence determination circuitry 20 and primary topographic echo switch 22 in the configuration of signal processor 5 shown in FIG. 4. Primary topographic echo switch 22 receives as inputs, strength (electric power) of a primary echo from first primary echo strength estimator 11a, strength (electric power) of the primary echo from second primary echo strength estimator 10b, a primary echo reception signal from primary echo phase correction circuitry 9, and a primary echo reception signal resulting from removal of a topographic echo from primary topographic echo remover 10a.

An operation of signal processor 5 shown in FIG. 8 will now be described. Secondary topographic echo presence determination circuitry 19 determines whether or not a topographic echo is present in the secondary echo region based on comparison of electric power of the secondary topographic echo provided from secondary topographic echo power difference calculator 8b with a prescribed threshold value (for the secondary topographic echo). When electric power of the secondary topographic echo is higher than the prescribed threshold value, the secondary topographic echo is determined as being present, and when electric power of the secondary topographic echo is lower than the prescribed threshold value, the secondary topographic echo is determined as being absent. Maximum electric power (strength) on which determination as absence of the secondary topographic echo can be based is set in advance as the prescribed threshold value (for the secondary topographic echo).

When a result of determination by secondary topographic echo presence determination circuitry 19 indicates presence of the topographic echo in the secondary echo, secondary echo reception signal switch 21a (FIG. 8) switches a line such that the topographic-echo-processed secondary echo (the reception signal in the secondary echo region) resulting from removal of the topographic echo in the secondary echo by secondary topographic echo remover 7a is provided to secondary echo velocity and width estimator 7c and strong-and-weak-echo switch 12b as in the first embodiment. Similarly, when the secondary topographic echo is present, secondary echo strength switch 21b (FIG. 8) switches a line such that strength of the topographic-echo-processed secondary echo estimated by second secondary echo strength estimator 7b is provided to strength comparator 12a as in the first embodiment. As described previously, the topographic-echo-processed secondary echo can be concluded as a secondary echo resulting from removal of a topographic echo or a secondary echo originally free from a topographic echo.

When a result of determination by secondary topographic echo presence determination circuitry 19 indicates absence of the topographic echo in the secondary echo, secondary echo reception signal switch 21a (FIG. 8) switches a line such that a topographic-echo-unprocessed secondary echo (a reception signal in the secondary echo region) estimated from the reception signal in the secondary echo region from secondary echo phase correction circuitry 6 is provided to secondary echo velocity and width estimator 7c and strong-and-weak-echo switch 12b as electric power of the topographic-echo-processed secondary echo. Similarly, when there is no secondary topographic echo, secondary echo strength switch 21b (FIG. 8) switches a line such that strength of the secondary echo before removal of the topographic echo estimated by first secondary echo strength estimator 8a is provided to strength comparator 12a as strength of the topographic-echo-processed secondary echo. Electric power of the topographic-echo-processed secondary echo can be concluded as electric power of a secondary echo resulting from removal of a topographic echo or electric power of a secondary echo originally free from a topographic echo.

Similarly to the operation by secondary topographic echo presence determination circuitry 19, primary topographic echo presence determination circuitry 20 determines whether or not there is a topographic echo in the primary echo region based on comparison between electric power of the primary topographic echo provided from primary topographic echo power difference calculator 11b with a prescribed threshold value. When electric power of the primary topographic echo is higher than the prescribed threshold value (for the primary topographic echo), the primary topographic echo is determined as being present, and when electric power is lower than the prescribed threshold value, the primary topographic echo is determined as being absent. Maximum electric power (strength) on which determination as absence of the primary topographic echo can be based is set in advance as the prescribed threshold value (for the primary topographic echo).

When a result of determination by primary topographic echo presence determination circuitry 20 indicates presence of the topographic echo in the primary echo, primary echo reception signal switch 22a (FIG. 8) switches a line such that a topographic-echo-processed primary echo (a reception signal in the primary echo region) resulting from removal of the topographic echo in the primary echo by primary topographic echo remover 10a is provided to primary echo velocity and width estimator 10c and strong-and-weak-echo switch 12b as in the first embodiment. Similarly, when there is a primary topographic echo, primary echo strength switch 22b (FIG. 8) switches a line such that strength of the topographic-echo-processed primary echo estimated by second primary echo strength estimator 10b is provided to strength comparator 12a as in the first embodiment. As described previously, the topographic-echo-processed primary echo can be concluded as a primary echo resulting from removal of a topographic echo or a primary echo originally free from a topographic echo.

When a result of determination by primary topographic echo presence determination circuitry 20 indicates absence of the topographic echo in the primary echo, primary echo reception signal switch 22a (FIG. 8) switches a line such that a topographic-echo-unprocessed primary echo (a reception signal in the primary echo region) estimated from the reception signal in the primary echo region from primary echo phase correction circuitry 9 is provided to primary echo velocity and width estimator 10c and strong-and-weak-echo switch 12b as electric power of the topographic-echo-processed primary echo. Similarly, when there is no primary topographic echo, primary echo strength switch 22b (FIG. 8) switches a line such that strength of the primary echo before removal of the topographic echo estimated by first primary echo strength estimator 11a is provided to strength comparator 12a as strength of the topographic-echo-processed primary echo. Electric power of the topographic-echo-processed primary echo can be concluded as electric power of a primary echo resulting from removal of a topographic echo or electric power of a primary echo originally free from a topographic echo.

Therefore, secondary echo reception signal switch 21a can be concluded as a part of secondary echo processor 7. Secondary echo strength switch 21b can be concluded as a part of secondary echo processor 7 and secondary topographic echo processor 8. In other words, secondary topographic echo switch 21 can be concluded as a part of secondary echo processor 7 and secondary topographic echo processor 8. Similarly, primary echo reception signal switch 22a can be concluded as a part of primary echo processor 10. Primary echo strength switch 22b can be concluded as a part of primary echo processor 10 and primary topographic echo processor 11. In other words, primary topographic echo switch 22 can be concluded as a part of primary echo processor 10 and primary topographic echo processor 11.

The function of secondary topographic echo switch 21 can be concluded as selection of strength of the secondary echo provided to strong-and-weak-echo distinction and output circuitry 12 and a type of a secondary echo reception signal based on a result of determination as to presence of the secondary topographic echo from secondary topographic echo presence determination circuitry 19. In other words, when the secondary topographic echo is present, strength of the secondary echo estimated by second secondary echo strength estimator 7b is selected based on the secondary echo reception signal resulting from removal of the secondary topographic echo processed by secondary topographic echo remover 7a and the secondary echo reception signal resulting from removal of the secondary topographic echo. When the secondary topographic echo is absent, the secondary echo reception signal provided from secondary echo phase correction circuitry 6 and strength of the secondary echo provided from first secondary echo strength estimator 8a are selected.

Operations by primary topographic echo presence determination circuitry 20 and primary topographic echo switch 22 are the same as operations by secondary topographic echo presence determination circuitry 19 and secondary topographic echo switch 21 except for change from the secondary echo to the primary echo. When the topographic echo is present, weak echo strength correction circuitry 16 corrects strength of the echo based on a result of determination as to presence of the topographic echo in the primary echo or the secondary echo tagged as the weak echo, and when the topographic echo is absent, it does not correct the strength of the echo but provides a result from weak echo strength estimator 15a as it is as input to weak echo parameter output circuitry 17.

Suitable steps (processing, process steps, ST) in the signal processing method according to the second embodiment described with reference to FIG. 7 will be described further with reference to FIG. 9. In the drawings of the present application, the same or corresponding elements have the same reference characters allotted and detailed description thereof may not be provided. Though the signal processing method according to the second embodiment is described as processing relating to processing from strong-and-weak-echo distinction and output circuitry 12 of the signal processing apparatus according to the second embodiment, a part relating to processing in a stage preceding strong-and-weak-echo distinction and output circuitry 12 may also be regarded as being included in the signal processing method according to the second embodiment as described previously.

Figure 9:
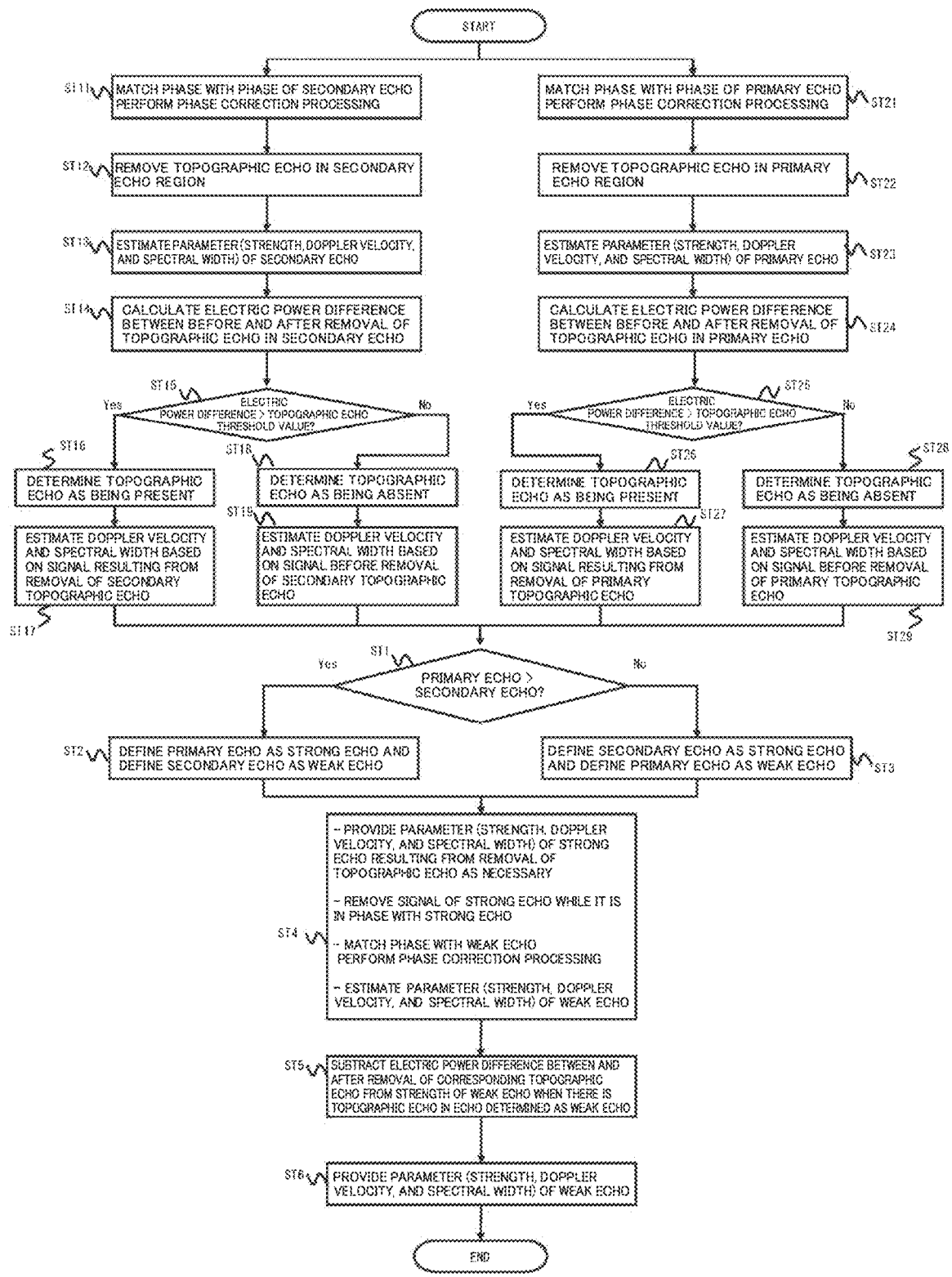
FIG. 9 is a flowchart of the signal processing method according to the second embodiment of the present invention.

A flowchart shown in FIG. 9 additionally includes new steps from ST15 to ST19 between ST14 and ST1 and new steps from ST25 to ST29 between ST24 and ST1, based mainly on combination of step ST1 and subsequent steps in the flowchart shown in FIG. 7 with steps before ST1 in FIG. 5 with reference to which the signal processing method according to the first embodiment is described. The steps from ST15 to ST19 represent processing performed by secondary echo processor 7 and secondary topographic echo processor 8 by operations by secondary topographic echo presence determination circuitry 19 and secondary topographic echo switch 21. The steps from ST25 to ST29 represent processing performed by primary echo processor 10 and primary topographic echo processor 11 by operations by primary topographic echo presence determination circuitry 20 and primary topographic echo switch 22.

In FIG. 9, for a secondary echo, a difference from FIG. 5 resides in calculation of electric power and difference in electric power between before and after removal of the topographic echo in the secondary echo (ST14) after removal of the topographic echo in the secondary echo region (ST12), followed by comparison of magnitude of the difference in electric power of the secondary topographic echo with magnitude of a prescribed threshold value of the topographic echo (ST15). When the difference in electric power of the secondary topographic echo is larger, the topographic echo is determined as being present (ST16). The Doppler velocity and the spectral width are estimated from the reception signal resulting from removal of the secondary topographic echo (ST17). Magnitude of the difference in electric power of the secondary topographic echo is compared with magnitude of the prescribed threshold value of the topographic echo (ST15), and when the difference in electric power of the secondary topographic echo is smaller, the topographic echo is determined as being absent (ST18). The Doppler velocity and the spectral width are estimated from the reception signal before removal of the secondary topographic echo (ST19). When the topographic echo is present in the weak echo, the difference in electric power between before and after removal of the corresponding topographic echo is subtracted from strength of the weak echo, and when the topographic echo is absent, such subtraction is not made (ST5).

Similarly, for a primary echo, a difference from FIG. 5 resides in calculation of electric power and difference in electric power between before and after removal of the topographic echo in the primary echo (ST24) after removal of the topographic echo in the primary echo region (ST22), followed by comparison of magnitude of the difference in electric power of the primary topographic echo with magnitude of a prescribed threshold value of the topographic echo (ST25). When the difference in electric power of the primary topographic echo is larger, the topographic echo is determined as being present (ST26). The Doppler velocity and the spectral width are estimated from the reception signal resulting from removal of the primary topographic echo (ST27). Magnitude of the difference in electric power of the primary topographic echo is compared with magnitude of the prescribed threshold value of the topographic echo (ST25), and when the difference in electric power of the primary topographic echo is smaller, the topographic echo is determined as being absent (ST28). The Doppler velocity and the spectral width are estimated from the reception signal before removal of the primary topographic echo (ST29). When the topographic echo is present in the weak echo, the difference in electric power between before and after removal of the corresponding topographic echo is subtracted from strength of the weak echo, and when the topographic echo is absent, such subtraction is not made (ST5).

As set forth above, with the signal processing apparatus and the signal processing method according to the second embodiment, strength (electric power) of the topographic echo is estimated in topographic echo removal processing in advance, and not only strength of the weak echo is corrected in a subsequent stage by using that value, but also topographic echo removal processing is not performed (a reception signal or electric power subjected to topographic echo removal processing is not used) when the topographic echo is absent. Therefore, the signal processing apparatus and the signal processing method according to the second embodiment can further be free from deterioration of performance in suppressing a topographic echo in the weak echo and can suppress also deterioration in accuracy in estimation of a spectral parameter (strength) of the weak echo.

In the first and second embodiments above, strength (electric power) estimated by secondary echo processor 7, first secondary echo strength estimator 8a, second secondary echo strength estimator 7b, primary echo processor 10, first primary echo strength estimator 11a, or second primary echo strength estimator 10b is sent out of strong echo parameter output circuitry 18 as strength (electric power) of an echo determined as a strong echo. Strictly speaking, however, such strength (electric power) contains a weak echo component (because processing for suppressing the weak echo is not performed thereon). The weak echo component that deteriorates accuracy in estimation of strength (electric power) of the strong echo, that is, the weak echo superimposed on the strong echo component, can be considered as white noise distributed over a frequency axis when it is in phase with the strong echo, for example, in phase modulation between pulses using a pseudo random code. When phase modulation between pulses is carried out, for example, using a systematic code sequence and when the weak echo is in phase with the strong echo, a plurality of replicated weak echo components appear periodically over the frequency axis. Therefore, in particular when difference in strength from the weak echo is small, accuracy in estimation of strength (electric power) of the strong echo may become poor.

Figure 10:
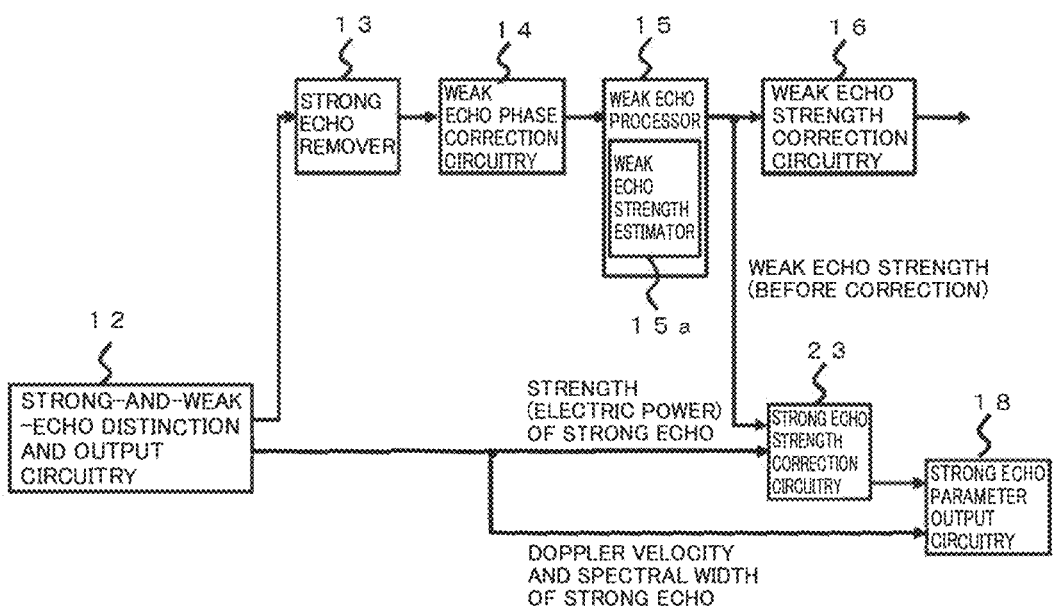
FIG. 10 is a (partial) functional block diagram of the signal processing apparatus according to the first and second embodiments of the present invention.

FIG. 10 is a (partial) functional block diagram where strong echo strength correction circuitry 23 that corrects strength (electric power) of a strong echo is provided as compared with the signal processing apparatus and method in the first and second embodiments. FIG. 10 shows only functional blocks in stages preceding and subsequent to strong echo strength correction circuitry 23. Other functional blocks can be the same as those in the configuration in FIG. 2, 4, 6, or 8. Strong echo strength correction circuitry 23 corrects electric power that represents the spectral parameter of a strong echo with uncorrected weak echo electric power (that is, electric power before correction by weak echo strength correction circuitry 16) which is electric power of the weak echo estimated by weak echo processor 15 (weak echo strength estimator 15*a*) and not corrected with electric power of a topographic echo representing the weak echo parameter. Specifically, upon receiving as input, strength of the weak echo (before correction by weak echo strength correction circuitry 16) provided from weak echo processor 15 or weak echo strength estimator 15*a* and strength (electric power) of the strong echo provided from strong-and-weak-echo distinction and output circuitry 12, strong echo strength correction circuitry 23 provides corrected strength (electric power) of the strong echo to strong echo parameter output circuitry 18.

A manner of correction of strength of the strong echo by strong echo strength correction circuitry 23 is different depending on a method of calculating strength (electric power) of the strong echo. For example, when a zero-order moment directed to the entire range on the frequency axis is used, strength of the weak echo provided from weak echo processor 15 or weak echo strength estimator 15*a* is subtracted from strength (electric power) of the strong echo provided from strong-and-weak-echo distinction and output circuitry 12. In other words, strong echo strength correction circuitry 23 makes correction to subtract uncorrected weak echo electric power from electric power that represents the spectral parameter of the strong echo.

For example, when a zero-order moment directed to a prescribed frequency range (a prescribed range with a peak of a spectrum of the strong echo being defined as the center) is used, only a weak echo component in the prescribed frequency range is superimposed on the strong echo. Therefore, a result of division of the strength of the weak echo provided from weak echo processor 15 or weak echo strength estimator 15*a* by a ratio of the prescribed frequency range to the entire frequency range is subtracted from strength (electric power) of the strong echo provided from strong-and-weak-echo distinction and output circuitry 12. In other words, strong echo strength correction circuitry 23 makes correction to subtract a result of division of uncorrected weak echo electric power by a predetermined ratio from electric power that represents the spectral parameter of the strong echo. The predetermined ratio is a ratio of the prescribed frequency range to the entire frequency range described previously.

As set forth above, preferably the signal processing apparatus according to the first and second embodiments can achieve improvement in accuracy in estimation of strength (electric power) of the strong echo by correction of strength (electric power) of the strong echo with strength of the weak echo superimposed on the strong echo. Operations by strong echo strength correction circuitry 23 in such a signal processing apparatus according to the first and second embodiments should only be performed as processing in the spectral parameter determination step in the signal processing method according to the first and second embodiments.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST

1 transmitter; 2 transmission and reception switch; 3 aerial wire portion (antenna portion, undulation emitter and accepter); 4 receiver; 5 signal processor (signal processing apparatus); 6 secondary echo phase correction circuitry; 7 secondary echo processor; 7*a* secondary topographic echo remover; 7*b* second secondary echo strength estimator; 7*c* secondary echo velocity and width estimator; 8 secondary topographic echo processor; 8*a* first secondary echo strength estimator; 8*b* secondary topographic echo power difference calculator; 9 primary echo phase correction circuitry; 10 primary echo processor; 10*a* primary topographic echo remover; 10*b* second primary echo strength estimator; 10*c* primary echo velocity and width estimator; 11 primary topographic echo strength processor; 11*a* first primary echo strength estimator; 11*b* primary topographic echo power difference calculator; 12 strong-and-weak-echo distinction and output circuitry; 12*a* strength comparator; 12*b* strong-and-weak-echo switch; 13 strong echo remover; 14 weak echo phase correction circuitry; 15 weak echo processor; 15*a* weak echo strength estimator; 15*b* weak echo velocity and width estimator; 16 weak echo strength correction circuitry; 17 weak echo parameter output circuitry (weak echo spectral parameter output circuitry); 18 strong echo parameter output circuitry (strong echo spectral parameter output circuitry); 19 secondary topographic echo presence determination circuitry; 20 primary topographic echo presence determination circuitry; 21 secondary topographic echo switch; 21*a* secondary echo reception signal switch; 21*b* secondary echo strength switch; 22 primary topographic echo switch; 22*a* primary echo reception signal switch; 22*b* primary echo strength switch; 23 strong echo strength correction circuitry

The invention claimed is:

1. A signal processing apparatus that performs signal processing on a reception signal of a reflected wave of pulsed undulation repeatedly transmitted into a space, the signal processing apparatus comprising:

secondary echo phase correction circuitry to generate a reception signal in a secondary echo region by phase correction of the reception signal of the reflected wave;

a secondary echo processor to remove a topographic echo from the reception signal in the secondary echo region and estimate electric power of a topographic-echo-processed secondary echo, a spectral width of the topographic-echo-processed secondary echo, and a Doppler velocity of the topographic-echo-processed secondary echo;

a secondary topographic echo processor to estimate electric power of a topographic-echo-unprocessed secondary echo from the reception signal in the secondary echo region and calculate electric power of a secondary topographic echo based on a difference between electric power of the topographic-echo-unprocessed secondary echo and electric power of the topographic-echo-processed secondary echo;

primary echo phase correction circuitry to generate a reception signal in a primary echo region by phase correction of the reception signal of the reflected wave;

a primary echo processor to remove the topographic echo from the reception signal in the primary echo region and estimate electric power of a topographic-echo-processed primary echo, a spectral width of the topographic-echo-processed primary echo, and a Doppler velocity of the topographic-echo-processed primary echo;

a primary topographic echo processor to estimate electric power of a topographic-echo-unprocessed primary echo from the reception signal in the primary echo region and calculate electric power of a primary topographic echo based on a difference between electric power of the topographic-echo-unprocessed primary echo and electric power of the topographic-echo-processed primary echo;

strong-and-weak-echo distinction and output circuitry to compare the topographic-echo-processed secondary echo with the topographic-echo-processed primary echo, make categorization into a strong echo and a weak echo, and provide as weak echo parameters, (i) a strong-topographic-echo-removed reception signal resulting from removal of the topographic echo in the primary echo or the secondary echo determined as the strong echo and (ii) electric power of the topographic echo in the secondary echo or the primary echo determined as the weak echo;

a strong echo remover to generate a reception signal resulting from removal of a frequency component of the strong echo from the strong-topographic-echo-removed reception signal representing the weak echo parameter;

weak echo phase correction circuitry to generate a reception signal in a weak echo region by phase correction of the reception signal resulting from removal of the frequency component of the strong echo;

a weak echo processor to estimate from the reception signal in the weak echo region, electric power of the weak echo, a spectral width of the weak echo, and a Doppler velocity of the weak echo; and weak echo strength correction circuitry to correct electric power of the weak echo with electric power of the topographic echo representing the weak echo parameter, wherein electric power of the weak echo corrected by the weak echo strength correction circuitry, and the spectral width of the weak echo and the Doppler velocity of the weak echo estimated by the weak echo processor are provided as spectral parameters of the weak echo.

2. The signal processing apparatus according to claim 1, wherein the weak echo strength correction circuitry removes the topographic echo in the secondary echo or the primary echo determined as the weak echo from the secondary echo or the primary echo determined as the weak echo, by correcting with electric power of the topographic echo representing the weak echo parameter, electric power of the weak echo estimated from the reception signal in the weak echo region, the reception signal in the weak echo region being obtained by phase correction of the reception signal resulting from removal of the frequency component of the strong echo from the strong-topographic-echo-removed reception signal which results from removal of the topographic echo in the primary echo or the secondary echo determined as the strong echo.

3. The signal processing apparatus according to claim 1, wherein the secondary echo processor removes the topographic echo in the reception signal in the secondary echo region by estimating a low-frequency component of the topographic echo in the reception signal in the secondary echo region, and the primary echo processor removes the topographic echo in the reception signal in the primary echo region by estimating a low-frequency component of the topographic echo in the reception signal in the primary echo region.

4. The signal processing apparatus according to claim 1, further comprising:

secondary topographic echo presence determination circuitry to determine whether the secondary topographic echo is present based on electric power of the secondary topographic echo calculated by the secondary topographic echo processor; and primary topographic echo presence determination circuitry to determine whether the primary topographic echo is present based on electric power of the primary topographic echo calculated by the primary topographic echo processor, wherein when the secondary topographic echo presence determination circuitry determines the secondary topographic echo as being absent, the secondary echo processor (i) sets electric power of the topographic-echo-unprocessed secondary echo estimated from the reception signal in the secondary echo region as electric power of the topographic-echo-processed secondary echo and (ii) estimates the spectral width of the topographic-echo-unprocessed secondary echo and the Doppler velocity of the topographic-echo-unprocessed secondary echo as the spectral width of the topographic-echo-processed secondary echo and the Doppler velocity of the topographic-echo-processed secondary echo, respectively, when the primary topographic echo presence determination circuitry determines the primary topographic echo as being absent, the primary echo processor (i) sets electric power of the topographic-echo-unprocessed primary echo estimated from the reception signal in the primary echo region as electric power of the topographic-echo-processed primary echo and (ii) estimates the spectral width of the topographic-echo-unprocessed primary echo and the Doppler velocity of the topographic-echo-unprocessed primary echo as the spectral width of the topographic-echo-processed primary echo and the Doppler velocity of the topographic-echo-processed primary echo, respectively, when an echo determined as the weak echo by the strong-and-weak-echo distinction and output circuitry is the secondary echo and when the secondary topographic echo presence determination circuitry determines the secondary topographic echo as being absent, or when an echo determined as the weak echo by the strong-and-weak-echo distinction and output circuitry is the primary echo and when the primary topographic echo presence determination circuitry determines the primary topographic echo as being absent, the weak echo strength correction circuitry sets electric power estimated by the weak echo processor as electric power of the weak echo, in addition, when an echo determined as the strong echo by the strong-and-weak-echo distinction and output circuitry is determined by the secondary topographic echo presence determination circuitry or the primary topographic echo presence determination circuitry as being free from the secondary topographic echo or the primary topographic echo, the strong-and-weak-echo distinction and output circuitry provides as the weak echo parameter, the reception signal of the secondary echo or the primary echo determined as the weak echo instead of the strong-topographic-echo-removed reception signal, and the strong echo remover generates a reception signal resulting from removal of a frequency component of the strong echo from the reception signal of the secondary echo or the primary echo determined as the weak echo that represents the weak echo parameter.

5. The signal processing apparatus according to claim 1, wherein
the strong-and-weak-echo distinction and output circuitry makes categorization into the strong echo and the weak echo based on at least one of (i) a comparison of magnitude of electric power of the topographic-echo-processed secondary echo and electric power of the topographic-echo-processed primary echo and (ii) a comparison of magnitude of the spectral width of the topographic-echo-processed secondary echo and the spectral width of the topographic-echo-processed primary echo.

6. The signal processing apparatus according to claim 1, wherein
the strong-and-weak-echo distinction and output circuitry makes (i) a comparison of magnitude of electric power of the topographic-echo-processed secondary echo and electric power of the topographic-echo-processed primary echo and (ii) a comparison of magnitude of the spectral width of the topographic-echo-processed secondary echo and the spectral width of the topographic-echo-processed primary echo, and makes categorization into the strong echo and the weak echo with priority being placed on a result of comparison of magnitude of the spectral width over a result of comparison of magnitude of electric power.

7. The signal processing apparatus according to claim 1, wherein
the strong-and-weak-echo distinction and output circuitry provides as spectral parameters of the strong echo, electric power, the spectral width, and the Doppler velocity of the topographic-echo-processed echo of the secondary echo or the primary echo determined as the strong echo.

8. The signal processing apparatus according to claim 7, further comprising a strong echo strength correction circuitry, wherein
the strong echo strength correction circuitry corrects electric power that represents the spectral parameter of the strong echo with uncorrected weak echo electric power which is electric power of the weak echo, the electric power of the weak echo being estimated by the weak echo processor but not corrected with electric power of the topographic echo representing the weak echo parameter.

9. The signal processing apparatus according to claim 8, wherein
the strong echo strength correction circuitry
makes correction to subtract the uncorrected weak echo electric power from electric power that represents the spectral parameter of the strong echo, or
makes correction to subtract a result of division of the uncorrected weak echo electric power by a predetermined ratio from electric power that represents the spectral parameter of the strong echo.

10. A signal processing method of deriving a spectral parameter of a weak echo from electric power, a spectral width, and a Doppler velocity of a topographic-echo-processed echo resulting from removal of a topographic echo in a secondary echo as well as electric power, a spectral width, and a Doppler velocity of a topographic-echo-processed echo resulting from removal of a topographic echo in a primary echo, the electric power, the spectral widths, and the Doppler velocities being found from a reception signal of a reflected wave of pulsed undulation repeatedly transmitted into a space, the signal processing method comprising:

a determination step of comparing a topographic-echo-processed secondary echo and a topographic-echo-processed primary echo with each other and making categorization into a strong echo and the weak echo;

a weak echo parameter determination step of setting as weak echo parameters, (i) a strong-topographic-echo-removed reception signal resulting from removal of the topographic echo in the primary echo or the secondary echo determined as the strong echo in the determination step and (ii) electric power of a topographic echo in the secondary echo or the primary echo determined as the weak echo; and a spectral parameter output step of providing as spectral parameters of the weak echo, (i) electric power of the weak echo estimated from a reception signal in a weak echo region resulting from phase correction of a reception signal resulting from removal of a frequency component of the strong echo from the strong-topographic-echo-removed reception signal representing the weak echo parameter, (ii) a spectral width of the weak echo representing the weak echo parameter, and (iii) a Doppler velocity of the weak echo, wherein the spectral parameter output step includes providing as spectral parameters of the weak echo, electric power of the weak echo obtained by correcting electric power of the weak echo estimated from the reception signal in the weak echo region with electric power of the topographic echo representing the weak echo parameter in a weak echo strength correction step.

11. A signal processing apparatus that performs signal processing on a reception signal of a reflected wave of pulsed undulation repeatedly transmitted into a space, the signal processing apparatus comprising:

secondary echo phase correction circuitry to generate a reception signal in a secondary echo region by phase correction of the reception signal of the reflected wave;

a secondary echo processor to remove a topographic echo from the reception signal in the secondary echo region and estimate electric power of a topographic-echo-processed secondary echo, a spectral width of the topographic-echo-processed secondary echo, and a Doppler velocity of the topographic-echo-processed secondary echo;

a secondary topographic echo processor to estimate electric power of a topographic-echo-unprocessed secondary echo from the reception signal in the secondary echo region and calculate electric power of a secondary topographic echo based on a difference between electric power of the topographic-echo-unprocessed secondary echo and electric power of the topographic-echo-processed secondary echo;

secondary topographic echo presence determination circuitry to determine whether the secondary topographic echo is present based on electric power of the secondary topographic echo calculated by the secondary topographic echo processor;

primary echo phase correction circuitry to generate a reception signal in a primary echo region by phase correction of the reception signal of the reflected wave;

a primary echo processor to remove a topographic echo from the reception signal in the primary echo region and estimate electric power of a topographic-echo-processed primary echo, a spectral width of the topographic-echo-processed primary echo, and a Doppler velocity of the topographic-echo-processed primary echo;

a primary topographic echo processor to estimate electric power of a topographic-echo-unprocessed primary echo from the reception signal in the primary echo region and calculate electric power of a primary topographic echo based on a difference between electric power of the topographic-echo-unprocessed primary echo and electric power of the topographic-echo-processed primary echo;

primary topographic echo presence determination circuitry to determine whether the primary topographic echo is present based on electric power of the primary topographic echo calculated by the primary topographic echo processor;

strong-and-weak-echo distinction and output circuitry to compare the topographic-echo-processed secondary echo with the topographic-echo-processed primary echo, make categorization into a strong echo and a weak echo, and provide as weak echo parameters, (i) a strong-topographic-echo-removed reception signal resulting from removal of the topographic echo in the primary echo or the secondary echo determined as the strong echo and (ii) electric power of the topographic echo;

a strong echo remover to generate a reception signal resulting from removal of a frequency component of the strong echo from the strong-topographic-echo-removed reception signal representing the weak echo parameter;

weak echo phase correction circuitry to generate a reception signal in a weak echo region by phase correction of the reception signal resulting from removal of a frequency component of the strong echo; and a weak echo processor to estimate from the reception signal in the weak echo region, electric power of the weak echo, a spectral width of the weak echo, and a Doppler velocity of the weak echo, wherein when the secondary topographic echo presence determination circuitry determines the secondary topographic echo as being absent, the secondary echo processor (i) sets electric power of the topographic-echo-unprocessed secondary echo estimated from the reception signal in the secondary echo region as electric power of the topographic-echo-processed secondary echo and (ii) estimates the spectral width of the topographic-echo-unprocessed secondary echo and the Doppler velocity of the topographic-echo-unprocessed secondary echo as the spectral width of the topographic-echo-processed secondary echo and the Doppler velocity of the topographic-echo-processed secondary echo, respectively, when the primary topographic echo presence determination circuitry determines the primary topographic echo as being absent, the primary echo processor (i) sets electric power of the topographic-echo-unprocessed primary echo estimated from the reception signal in the primary echo region as electric power of the topographic-echo-processed primary echo and (ii) estimates the spectral width of the topographic-echo-unprocessed primary echo and the Doppler velocity of the topographic-echo-unprocessed primary echo as the spectral width of the topographic-echo-processed primary echo and the Doppler velocity of the topographic-echo-processed primary echo, respectively, when an echo determined as the weak echo by the strong-and-weak-echo distinction and output circuitry is the secondary echo and when the secondary topographic echo presence determination circuitry determines the secondary topographic echo as being absent, or when an echo determined as the weak echo by the strong-and-weak-echo distinction and output circuitry is the primary echo and when the primary topographic echo presence determination circuitry determines the primary topographic echo as being absent,
  the weak echo processor estimates from the reception signal in the weak echo region, electric power of the weak echo, the spectral width of the weak echo, and the Doppler velocity of the weak echo, in addition, when an echo determined as the strong echo by the strong-and-weak-echo distinction and output circuitry is determined by the secondary topographic echo presence determination circuitry or the primary topographic echo presence determination circuitry as being free from the secondary topographic echo or the primary topographic echo,
  the strong-and-weak-echo distinction and output circuitry provides as the weak echo parameter, the reception signal of the secondary echo or the primary echo determined as the strong echo instead of the strong-topographic-echo-removed reception signal, and
  the strong echo remover generates a reception signal resulting from removal of a frequency component of the strong echo from the reception signal of the secondary echo or the primary echo determined as the strong echo that represents the weak echo parameter.

12. The signal processing method according to claim 10, wherein
  the weak echo strength correction step includes removing the topographic echo in the secondary echo or the primary echo determined as the weak echo from the secondary echo or the primary echo determined as the weak echo by correcting with electric power of the topographic echo representing the weak echo parameter, electric power of the weak echo estimated from the reception signal in the weak echo region obtained by phase correction of a reception signal resulting from removal of a frequency component of the strong echo from the strong-topographic-echo-removed reception signal resulting from removal of the topographic echo in the primary echo or the secondary echo determined as the strong echo.

13. The signal processing method according to claim 10, wherein
  the determination step includes making determination for categorization into the strong echo and the strong echo by making at least one of a comparison of magnitude of electric power of the topographic-echo-processed echo and a comparison of magnitude of the spectral width of the topographic-echo-processed echo.

14. The signal processing method according to claim 10, wherein
  the determination step includes making determination for categorization into the strong echo and the strong echo by (i) making a comparison of magnitude of electric power of the topographic-echo-processed echo and a comparison of magnitude of the spectral width of the topographic-echo-processed echo and (ii) placing priority on a result of comparison of magnitude of the spectral width over a result of comparison of magnitude of electric power.

15. The signal processing method according to claim 10, further comprising a spectral parameter determination step, wherein
the spectral parameter determination step includes setting as spectral parameters of the strong echo, electric power, the spectral width, and the Doppler velocity of the topographic-echo-processed echo of the primary echo or the secondary echo determined as the strong echo in the determination step.

16. The signal processing method according to claim 15, wherein
the spectral parameter determination step includes correcting electric power representing the spectral parameter of the strong echo with uncorrected weak echo electric power which is electric power of the weak echo not corrected with electric power of the topographic echo representing the weak echo parameter.

17. The signal processing method according to claim 16, wherein
the spectral parameter determination step includes
making correction to subtract the uncorrected weak echo electric power from electric power that represents the spectral parameter of the strong echo, or
making correction to subtract a result of division of the uncorrected weak echo electric power by a predetermined ratio from electric power that represents the spectral parameter of the strong echo.

18. A signal processing method of deriving a spectral parameter of a weak echo from
any one of (i) electric power, a spectral width, and a Doppler velocity of a topographic-echo-processed echo resulting from removal of a topographic echo in a secondary echo and (ii) electric power, a spectral width, and a Doppler velocity of an echo before topographic echo processing of the secondary echo free from the topographic echo, and
any one of (i) electric power, a spectral width, and a Doppler velocity of a topographic-echo-processed echo resulting from removal of a topographic echo in a primary echo and (ii) electric power, a spectral width, and a Doppler velocity of an echo before topographic echo processing of the primary echo free from the topographic echo,
the electric power, the spectral widths, and the Doppler velocities being found from a reception signal of a reflected wave of pulsed undulation repeatedly transmitted into a space, the signal processing method comprising:
a determination step of comparing a topographic-echo-processed secondary echo and a topographic-echo-processed primary echo with each other and making categorization into a strong echo and the weak echo;
a weak echo parameter determination step of (i) setting as weak echo parameters, a strong-topographic-echo-removed reception signal and electric power of the topographic echo in the secondary echo or the primary echo determined as the weak echo in the determination step, (ii) setting as the strong-topographic-echo-removed reception signal, a reception signal before the topographic echo processing of the secondary echo or the primary echo determined as the strong echo when the primary echo or the secondary echo determined as the strong echo in the determination step is the primary echo free from the topographic echo or the secondary echo free from the topographic echo, and (iii) setting, when the topographic echo in the primary echo or the topographic echo in the secondary echo determined as the strong echo is present, an echo resulting from removal of the topographic echo as the strong-topographic-echo-removed reception signal; and
a spectral parameter output step of providing as spectral parameters of the weak echo, (i) electric power of the weak echo estimated from a reception signal in a weak echo region obtained by phase correction of a reception signal resulting from removal of a frequency component of the strong echo from the strong-topographic-echo-removed reception signal representing the weak echo parameter, (ii) the spectral width of the weak echo representing a weak echo parameter, and (iii) the Doppler velocity of the weak echo, wherein
the spectral parameter output step includes providing as the spectral parameter of the weak echo, when the topographic echo in the secondary echo or the topographic echo in the primary echo determined as the weak echo is present, electric power of the weak echo obtained by correcting electric power of the weak echo estimated from the reception signal in the weak echo region with electric power of the topographic echo representing the weak echo parameter in a weak echo strength correction step.

19. A signal processing method of deriving a spectral parameter of a weak echo from
any one of (i) electric power, a spectral width, and a Doppler velocity of a topographic-echo-processed echo resulting from removal of a topographic echo in a secondary echo and (ii) electric power, a spectral width, and a Doppler velocity of a topographic-echo-processed echo of the secondary echo free from the topographic echo, and
any one of (i) electric power, a spectral width, and a Doppler velocity of a topographic-echo-processed echo resulting from removal of a topographic echo in a primary echo and (ii) electric power, a spectral width, and a Doppler velocity of a topographic-echo-processed echo of the primary echo free from the topographic echo,
the electric power, the spectral widths, and the Doppler velocities being found from a reception signal of a reflected wave of pulsed undulation repeatedly transmitted into a space, the signal processing method comprising:
a determination step of comparing a topographic-echo-processed secondary echo and a topographic-echo-processed primary echo with each other and making categorization into a strong echo and the weak echo;
a weak echo parameter determination step of (i) setting as weak echo parameters, a strong-topographic-echo-removed reception signal and electric power of the topographic echo in the secondary echo or the primary echo determined as the weak echo in the determination step, (ii) setting as the strong-topographic-echo-removed reception signal, a reception signal before the topographic echo processing of the secondary echo or the primary echo determined as the strong echo when the primary echo or the secondary echo determined as the strong echo in the determination step is the primary echo free from the topographic echo or the secondary echo free from the topographic echo, and (iii) setting, when the topographic echo in the primary echo or the topographic echo in the secondary echo determined as the strong echo is present, an echo resulting from removal of the topographic echo as the strong-topographic-echo-removed reception signal; and a spectral parameter output step of providing as spectral parameters of the weak echo, (i) electric power of the weak echo estimated from a reception signal in a weak echo region obtained by phase correction of a reception signal resulting from removal of a frequency component of the strong echo from the strong-topographic-echo-removed reception signal representing the weak echo parameter, (ii) the spectral width of the weak echo representing the weak echo parameter, and (iii) the Doppler velocity of the weak echo, wherein the spectral parameter output step includes providing as spectral parameters of the weak echo, when the topographic echo in the secondary echo or the topographic echo in the primary echo determined as the weak echo is absent, electric power of the weak echo, the spectral parameter of the weak echo representing the weak echo parameter, and the Doppler velocity of the weak echo.

* * * * *